(12) United States Patent
Ushigome et al.

(10) Patent No.: US 7,631,972 B2
(45) Date of Patent: Dec. 15, 2009

(54) WAVELENGTH-SELECTIVE POLARIZATION CONVERSION ELEMENT, ILLUMINATION OPTICAL SYSTEM, PROJECTION DISPLAY OPTICAL SYSTEM, AND IMAGE PROJECTION APPARATUS

(75) Inventors: Reona Ushigome, Utsunomiya (JP); Yu Yamauchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 607 days.

(21) Appl. No.: 11/608,110

(22) Filed: Dec. 7, 2006

(65) Prior Publication Data

US 2007/0133631 A1    Jun. 14, 2007

(30) Foreign Application Priority Data

Dec. 9, 2005    (JP)    ............... 2005-356595

(51) Int. Cl.
G03B 21/14    (2006.01)
G02B 1/10    (2006.01)
G02B 27/14    (2006.01)
G02B 27/12    (2006.01)

(52) U.S. Cl. ................. 353/20; 353/38; 359/583; 359/437; 359/629; 359/639

(58) Field of Classification Search ............ 353/20, 353/38; 359/583, 437, 629, 639
See application file for complete search history.

(56) References Cited

U.S. PATENT DOCUMENTS

| | | | |
|---|---|---|---|
| 6,130,728 A | 10/2000 | Tsujikawa et al. | |
| 6,343,864 B1 * | 2/2002 | Tajiri ......................... | 353/20 |
| 6,347,014 B1 | 2/2002 | Hayashi et al. | |
| 6,742,897 B1 | 6/2004 | Tajiri | |
| 6,840,626 B2 * | 1/2005 | Ikeda et al. .................. | 353/33 |
| 7,472,995 B2 * | 1/2009 | Yamauchi et al. ............. | 353/20 |

(Continued)

FOREIGN PATENT DOCUMENTS

EP    1008895 A1    6/2000

(Continued)

OTHER PUBLICATIONS

Extended European Search Report issued on Oct. 24, 2008 for the corresponding European Application No. EP 06125584.

(Continued)

Primary Examiner—Diane I Lee
Assistant Examiner—Magda Cruz
(74) Attorney, Agent, or Firm—Rossi, Kimms & McDowell LLP

(57) ABSTRACT

A wavelength-selective polarization conversion element is disclosed which has a polarization conversion function that has been obtained by a polarization conversion element and a wavelength-selective phase plate in the past. The element includes a polarization beam splitting film and a phase plate. The film splits light and has a characteristic in which the transmittance for light with a first polarization direction and the transmittance for light with a second polarization direction are changed between a value higher than 50% and a value lower than 50% depending on wavelength region. The phase plate changes the polarization direction of light transmitted or reflected by the film between the first and second polarization directions. The element converts light in two of the first to third wavelength regions into polarized light with one polarization direction and converts light in the other wavelength region into polarized light with another polarization direction.

10 Claims, 15 Drawing Sheets

U.S. PATENT DOCUMENTS

2004/0057019 A1  3/2004  Sokolov

FOREIGN PATENT DOCUMENTS

| EP | 1260836 A1 | 11/2002 |
| EP | 1762882 A1 | 3/2007 |
| JP | H11-153774 | 6/1999 |
| JP | 2001-154152 | 6/2001 |
| JP | 2001-209007 | 8/2001 |

OTHER PUBLICATIONS

English translation of Chinese Office Action Dated dated Feb. 15, 2008.

Li Li et at., High-performance thin-film polarizing beam splitter operating at angles greater than the critical angle, Applied Optics, Jun. 1, 2000, pp. 2754-2771, vol. 39, No. 16, Optical Society of America.

* cited by examiner

WAVELENGTH-SELECTIVE POLARIZATION CONVERSION ELEMENT, ILLUMINATION OPTICAL SYSTEM, PROJECTION DISPLAY OPTICAL SYSTEM, AND IMAGE PROJECTION APPARATUS

BACKGROUND OF THE INVENTION

The present invention relates to a wavelength-selective polarization conversion element which converts non-polarized light into polarized light with a direction depending on wavelength regions (colors) and an image projection apparatus such as a liquid crystal projector including the wavelength-selective polarization conversion element.

Each of Japanese Patent Laid-Open No. 2001-154152 and U.S. Pat. No. 6,742,897 has disclosed an image projection apparatus which performs color separation and color combination with a polarization beam splitter. In the apparatus, non-polarized light emitted from a light source is split into a plurality of luminous fluxes by a lens array, and secondary images of the light source are formed by the respective luminous fluxes and are caused to overlap with each other on an image-forming element such as a liquid crystal panel by a condenser lens to illuminate the image-forming element at substantially uniform brightness.

The split luminous fluxes that emerged from the lens array enter a plurality of polarization conversion cells provided in a polarization conversion element such that the cells are associated with lens cells of the lens array. Each of the polarization conversion cells has a polarization beam splitting film, a half-wave plate and a reflecting surface. Non-polarized light entering each polarization conversion cell is split into P-polarized light and S-polarized light by the polarization beam splitting film. The P-polarized light is transmitted through the polarization beam splitting film. The polarization direction thereof is rotated by 90 degrees by the half-wave plate, and then the resulting S-polarized light emerges therefrom. On the other hand, the S-polarized light is reflected by the polarization beam splitting film, reflected by the reflecting surface, and then emerges without any change.

The S-polarized light with only one polarization direction emerges from the polarization conversion element and enters the condenser lens. The S-polarized light then emerges from the condenser lens and is split into light in first and second wavelength regions and light in a third wavelength region by a dichroic element. At this point, the light in the first wavelength region and the light in the second wavelength region travel along the same optical path and have the same polarization direction. Then, the light in the first and second wavelength regions is passed through a wavelength (color)-selective phase plate in order to direct the light in the first wavelength region and light in the second wavelength region to a first image-forming element and a second image-forming element, respectively, with a polarization beam splitter. This can split the light in the first and second wavelength regions into light components polarized in different directions. The wavelength-selective phase plate is formed by laminating plural stretched films and has a function of converting only one of the light in the first wavelength region and the light in the second wavelength region into light with a polarization direction orthogonal to the original one and transmitting the light in the other wavelength region without changing its polarization direction.

The image projection apparatus which achieves color separation with the polarization beam splitter as described above typically includes the polarization conversion element placed near the lens array and the wavelength-selective phase plate disposed near the polarization beam splitter.

A particular optical element disclosed in each of U.S. Pat. No. 6,742,897 and Japanese Patent Laid-Open No. H11 (1999)-153774. U.S. Pat. No. 6,742,897 has disclosed an optical element formed of a first dichroic layer which transmits light in a predetermined wavelength region and reflects light in other wavelength regions, a phase layer which rotates the plane of polarization of the light transmitted through the first dichroic layer by 90 degrees, and a total reflection layer which totally reflects the light from the phase layer.

A conventional polarization beam splitter is intended to transmit P-polarized light and reflect S-polarized light over the entire used wavelength region. A polarization beam splitter which reflects P-polarized light and transmits S-polarized light has been reported in "Li Li and J. A. Dobrowolski, Appl. Opt., vol. 39, p. 2754, 2000". Any polarization beam splitter has a function of achieving polarization split over the entire used wavelength region. No report has been made on a polarization beam splitter which transmits S-polarized light and reflects P-polarized light in a certain wavelength region, and reflects S-polarized light and transmits P-polarized light in another wavelength region.

In the dichroic filter, the transmission wavelength region of P-polarized light is widened and the transmission wavelength region of S-polarized light is narrowed when light is incident obliquely thereon, so that polarization split is realized in a particular wavelength region. However, P-polarized light and S-polarized light are transmitted and reflected, respectively, at all times. P-polarized light is not reflected or S-polarized light is not transmitted. The polarization split characteristic is not reversed depending on the wavelength region.

Japanese Patent Laid-Open No. 11(1999)-153774 has disclosed a polarization beam splitter which has wavelength selectivity and performs polarization of light, analysis of light, color separation and color combination. It has disclosed a color separation/combination means which includes the polarization beam splitter having a function of reflecting P-polarized light and transmitting S-polarized light in a wavelength region of blue and transmitting P-polarized light and reflecting S-polarized light in wavelength regions of green and red. However, only the function of the polarization beam splitter has been described, and no disclosure has been made of how to embody it.

When the wavelength-selective phase plate is used in addition to the polarization conversion element as disclosed in Japanese Patent Laid-Open No. 2001-154152, however, the number of optical components of the image projection apparatus is increased. It is also necessary to provide a member for positioning and supporting the wavelength-selective phase plate and a member for cooling the wavelength-selective phase plate formed of the multilayer film, thereby complicating the structure.

BRIEF SUMMARY OF THE INVENTION

The present invention provides a wavelength-selective polarization conversion element which has a polarization conversion function that has been realized by a polarization conversion element and a wavelength-selective phase plate in the past and achieves a reduced number of optical components and a simplified structure in an image projection apparatus.

The present invention in its first aspect provides a wavelength-selective polarization conversion element which converts non-polarized light containing light in a first wavelength region, light in a second wavelength region and light in a third wavelength region into polarized light. The polarization conversion element includes a polarization beam splitting film which has a function of splitting light through transmission and reflection and has a characteristic in which each of the transmittance for light with a first polarization direction and the transmittance for light with a second polarization direction orthogonal to the first polarization direction is changed between a value higher than 50% and a value lower than 50% depending on the wavelength region, and a phase plate which changes the polarization direction of light transmitted or reflected by the polarization beam splitting film between the first polarization direction and the second polarization direction. The polarization conversion element causes light in two of the first, second and third wavelength regions to emerge as polarized light with one of the first and second polarization directions and causes light in the other one of the first, second and third wavelength regions to emerge as polarized light with the other of the first and second polarization directions.

The present invention in its other aspects also provides an illumination optical system, an image display optical system, an image projection apparatus and an image projection system, in which the abovementioned polarization conversion element is used.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the accompanying drawings.

Embodiment 1

Figure 1:
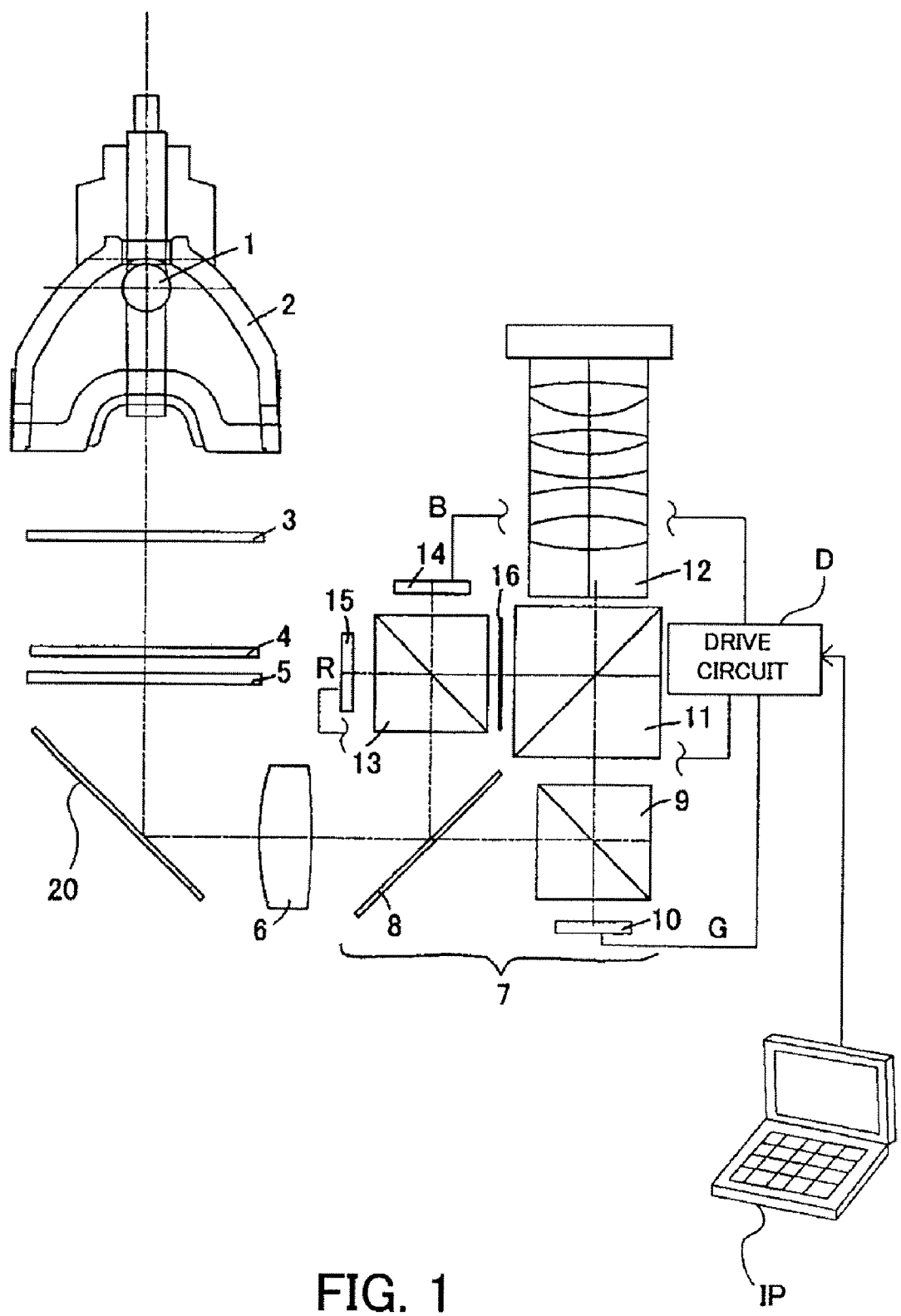
FIG. 1 shows the structures of a projection display optical system and a liquid crystal projector including the projection display optical system, which are Embodiment 1 of the present invention.

FIG. 1 shows the structure of a projection display optical system in which a wavelength-selective polarization conversion element, which is Embodiment 1 of the present invention, is used as well as the structure of a liquid crystal projector (image projection apparatus) including the projection display optical system.

A luminous flux emitted from a white light source 1 is converted into a collimated luminous flux by a parabolic reflector 2 and then emerges therefrom. The collimated luminous flux herein mentioned refers not only to a completely collimated luminous flux but also a luminous flux diverged or converged to some degree which can be considered as being collimated in terms of the characteristic of an optical system. This applies to Embodiments 2 to 5 described below.

The collimated luminous flux is divided into a plurality of luminous fluxes by a first fly-eye lens 3, and the respective divided luminous fluxes are converged. The respective divided luminous fluxes are converged at positions close to a second fly-eye lens 4 and a wavelength-selective polarization conversion element 5 and form images (secondary images) of the light source. Each of the fly-eye lenses 3 and 4 is formed of a plurality of lens cells arranged two-dimensionally. Each of the lens cells has a rectangular lens shape similar to a liquid crystal panel (image-forming element) which is a surface to be illuminated, later described.

The divided luminous fluxes emerging from the second fly-eye lens 4 and entering the wavelength-selective polarization conversion element 5 are non-polarized light containing P-polarized light which is linearly polarized light with a first polarization direction and S-polarized light which is linearly polarized light with a second polarization direction.

The wavelength-selective polarization conversion element 5 converts light in wavelength bands of red (R) and green (G) of the divided luminous fluxes emerging from the second fly-eye lens 4 into S-polarized light. The R and G bands are first and second wavelength regions, respectively. It also converts light in a wavelength band of blue (B), which is a third wavelength region, into P-polarized light.

In general, the wavelengths in the B band, G band and R band correspond to 430 to 500 nm, 500 to 580 nm and 580 to 670 nm, respectively. In the projector of Embodiment 1, however, the BGR bands defined above are not necessarily used, but the followings are used for the wavelengths of the BGR bands. For example, light with a wavelength band from 430 to 490 nm (or 435 to 485 nm) is used as light in the B band. Light with a wavelength band from 510 to 570 nm (or 515 to 565 nm) is used as light in the G band. Light with a wavelength band from 600 to 660 nm (or 605 to 655 nm) is used as light in the R band. This applies to Embodiments 2 to 5 described below. The abovementioned wavelengths are merely illustrative and the present invention is not limited thereto.

The S-polarized light in the R and G bands and the P-polarized light in the B band that emerged from the wavelength-selective polarization conversion element 5 are reflected by a mirror 20. Then, the divided luminous fluxes are gathered by a condenser lens 6 and overlapped with each other to illuminate reflective liquid crystal panels 15, 10 and 14 for the R, G and B bands through a color separation/combination optical system 7. The optical system including the elements from the light source to at least the condenser lens 6 is referred to as an illumination optical system. This applies to Embodiments 2 to 5 described below.

The color separation/combination optical system 7 includes a dichroic mirror 8 which reflects the light in the B and R bands and transmits the light in the G band, of the polarized light transmitted through the condenser lens 6. The polarized light in the G band transmitted through the dichroic mirror 8 is reflected by a first polarization beam splitter 9 and enters the reflective liquid crystal panel 10 for the G band.

Each of the reflective liquid crystal panels is connected to a drive circuit D. The drive circuit D is part of the projector (image projection apparatus) on which the projection display optical system is mounted and receives an image signal input thereto from an image supply apparatus IP such as a personal computer, a DVD player, a VCR and a TV tuner. Those elements constitute an image display system. Based on the R, G and B components of the input image signal, the drive circuit D drives the reflective liquid crystal panels associated with respective colors. This causes each of the reflective liquid crystal panels to reflect and modulate incident light in each wavelength band and provide the reflected light as image light. The abovementioned structure is also used in Embodiment 2 to 5 described below, although not shown.

The image light (polarized light) from the liquid crystal panel for the G band (hereinafter referred to as the G liquid crystal panel) 10 is transmitted through the first polarization beam splitter 9, then transmitted through a second polarization beam splitter 11 and projected onto a screen, not shown, by a projection lens 12.

On the other hand, of the polarized light in the B and R bands reflected by the dichroic mirror 8, the polarized light in the B band is transmitted through a third polarization beam splitter 13, and the polarized light in the R band is reflected by the third polarization beam splitter 13. The polarized light in the R band and the polarized light in the B band that emerged from the third polarization beam splitter 13 reach the liquid crystal panel for the R band (hereinafter referred to as the R liquid crystal panel) 15 and the liquid crystal panel for the B band (hereinafter referred to as the B liquid crystal panel) 14, respectively.

The polarized light in the B band reflected and modulated by the B liquid crystal panel 14 is reflected by the third polarization beam splitter 13. The polarized light in the R band reflected and modulated by the R liquid crystal panel 15 is transmitted through the third polarization beam splitter 13. Only the polarization direction of the polarized light in the R band is rotated by 90 degrees by a wavelength-selective phase plate 16 to provide the polarized light in the R band and the polarized light in the B band with the same polarization direction. The polarized light in the R and B bands is reflected by the second polarization beam splitter 11 and projected onto the screen by the projection lens 12. In this manner, the projected image of full color (RGB) is displayed on the screen.

Next, the structure and the optical effects of the abovementioned wavelength-selective polarization conversion element 5 will be described in detail with reference to FIG. 2. The wavelength-selective polarization conversion element 5 is formed of a plurality of polarization conversion cells C having the same structure and provided in association with the plurality of lens cells constituting each of the fly-eye lenses 3 and 4.

In the entrance surface of each of the polarization conversion cells C, a light-shield plate 34 is provided for blocking entrance of light in the area from the position of a wavelength-selective polarization beam splitting film 32, later described, to the position of a reflecting film 31 below that film 32. This causes light to enter the wavelength-selective polarization conversion element 5 only through the area between the wavelength-selective polarization beam splitting film 32 and the reflecting film 31 placed above that film 32 in the entrance surface of each polarization conversion cell C. Reference numeral 33 shows a phase plate. The wavelength-selective polarization beam splitting film 32 will hereinafter be referred to simply as the polarization beam splitting film.

Figure 2:
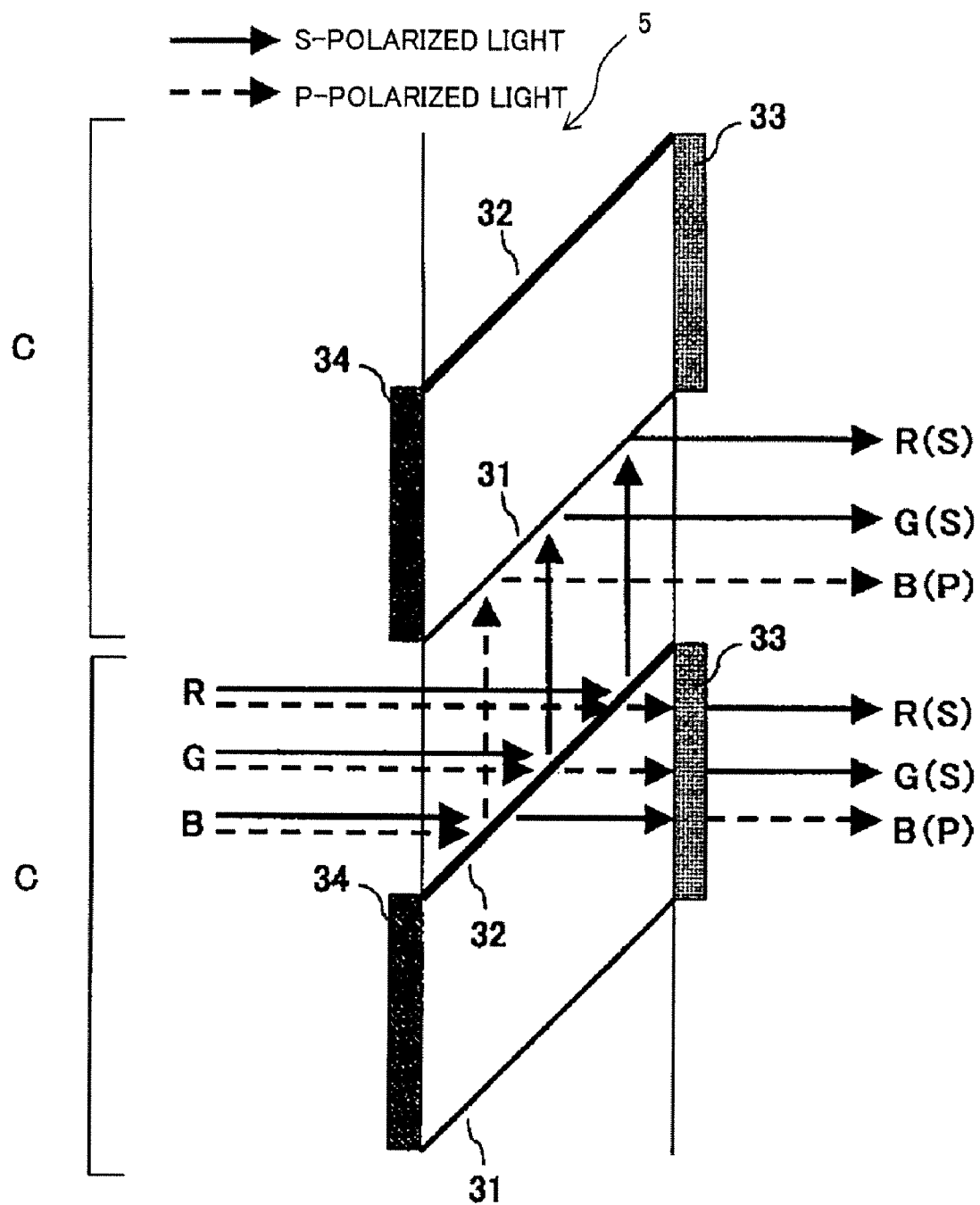
FIG. 2 is a schematic diagram showing the structure of a wavelength-selective polarization conversion element used in Embodiment 1.

The polarization beam splitting film 32 is placed at an inclination of 45 degrees with respect to the direction of entrance of light (from left to right in FIG. 2). The reflecting film 31 is disposed in parallel with the polarization beam splitting film 32. The polarization beam splitting film 32 is actually formed as a multilayer film provided on a surface of a substrate made of glass or acrylic, which is a parallel plate.

The phase plate 33 is formed as a film and provided in the area from the position of the reflecting film 31 to the position of the polarization beam splitting film 32 above that film 31 in the emergence surface of the wavelength-selective polarization conversion element 5.

Figure 3:
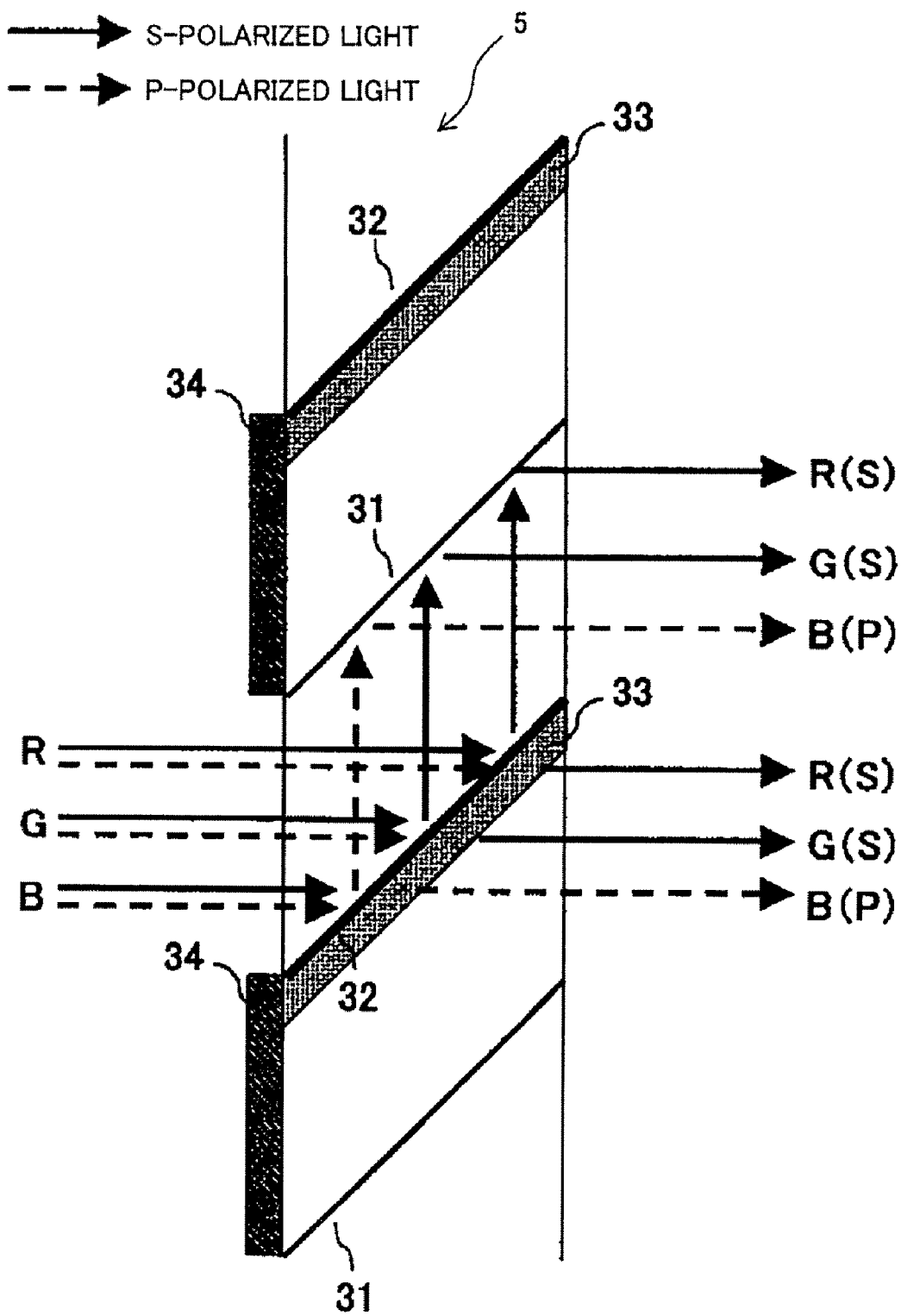
FIG. 3 is a schematic diagram showing the structure of a wavelength-selective polarization conversion element which is a modification of Embodiment 1.

Embodiment 1 describes a case where the phase plate 33 provided for the emergence surface of the wavelength-selective polarization conversion element 5. As shown in FIG. 3, however, the phase plate 33 may be provided on the emergence side of a substrate having the polarization beam splitting film 32 formed on the entrance side.

The polarization beam splitting film 32 has a characteristic in which the transmittance for P-polarized light in the R and G bands is 100% or close to 100% (higher than 50%) and the transmittance for P-polarized light in the B band is 0% or close to 0% (lower than 50%). The polarization beam splitting film 32 also has a characteristic in which the transmittance for S-polarized light in the R and G bands is 0% or close to 0% (lower than 50%) and the transmittance for S-polarized light in the B band is 100% or close to 100% (higher than 50%).

The phase plate 33 is a half-wave plate and has a function of rotating the polarization direction of entering linearly polarized light by 90 degrees.

White-color non-polarized light enters the wavelength-selective polarization conversion element 5 having the abovementioned structure from the left in FIG. 2. Of the non-polarized light, P-polarized light in the R and G bands is transmitted through the polarization beam splitting film 32 and converted into S-polarized light by being transmitted through the phase plate 33, and the resulting S-polarized light in the R and G bands emerges from the wavelength-selective polarization conversion element 5. S-polarized light in the R and G bands is reflected by the polarization beam splitting film 32, reflected by the reflecting film 31, and then emerges from the wavelength-selective polarization conversion element 5 without any change.

P-polarized light in the B band is reflected by the polarization beam splitting film 32, reflected by the reflecting film 31, and then emerges from the wavelength-selective polarization conversion element 5 without any change. S-polarized light in the B band is transmitted through the polarization beam splitting film 32 and converted into P-polarized light by being transmitted through the phase plate 33, and the resulting P-polarized light in the B band emerges from the wavelength-selective polarization conversion element 5.

In this manner, the white-color non-polarized light enters the wavelength-selective polarization conversion element 5 formed as the single element and is converted into the S-polarized light in the R and G bands and the P-polarized light in the B band, and they emerge from the element 5.

Thus, the light in the B and R bands from the polarization conversion element 5 can be directed from the dichroic mirror 8 to the third polarization beam splitter 13 without passing through the conventionally used wavelength-selective phase plate. In other words, in this embodiment, the light in the B and R bands can be split by the third polarization beam splitter 13 depending on the polarization direction and directed to the B liquid crystal panel 14 and the R liquid crystal panel 15, respectively. As compared with the conventional case where the wavelength-selective phase plate is provided on the optical path from the dichroic mirror 8 to the third polarization beam splitter 13, the number of optical components can be reduced in the optical system. In addition, no need for the wavelength-selective phase plate can eliminate the need for a member for supporting or cooling it.

Next, description will be made of the multilayer structure of the polarization beam splitting film 32 having the optical characteristic of the high transmittance for P-polarized light and the low transmittance for S-polarized light in the R and G bands, and the low transmittance for P-polarized light and the high transmittance for S-polarized light in the B band.

The polarization beam splitting film 32 may have a film structure which directly provides the optical characteristic of a high transmittance for P-polarized light and a low transmittance for S-polarized light in the R and G bands, and a low transmittance for P-polarized light and a high transmittance for S-polarized light in the B band.

Another possible film may have a structure corresponding to that formed by laminating two film potions with different optical characteristics. For example, a first film portion has the optical characteristic of a high transmittance for P-polarized light in the R, G and B bands, a low transmittance for S-polarized light in the R and G bands, and a high transmittance for S-polarized light in the B band. A second film portion has a high transmittance for P-polarized light in the R and G bands, a low transmittance for P-polarized light in the B band, and a high transmittance for S-polarized light in the R, G and B bands.

A high transmittance and a low transmittance as used herein mean a higher value and a lower value than 50%, respectively. More specifically, a high transmittance (or a low reflectance) means a transmittance of higher than 50% (preferably 80% or higher) for light entering the polarization beam splitting film at a predetermined angle (45 degrees in this case), and conversely, a reflectance of lower than 50% (preferably 20% or lower). On the other hand, a low transmittance (or a high reflectance) means a transmittance of lower than 50% (preferably 20% or lower) for light entering the polarization beam splitting film at a predetermined angle (45 degrees in this case), and conversely, a reflectance of higher than 50% (preferably 80% or higher). This applies to the following description unless otherwise specified.

Yet another film structure may be employed which uses FTIR (Frustrated Total Internal Reflection) in which in a case where light enters a medium with a low refractive index from a prism with a high refractive index at a critical angle or larger and a thin-film exists in an area where an evanescent wave emerges, the light is transmitted therethrough and its phase is changed. The present invention is not limited to the above-mentioned film structures.

Table 1 shows an example of the polarization beam splitting film (PBS film) 32 having a structure corresponding to that formed by laminating the two film portions described above. PBH56 manufactured by OHARA INC. was used as the glass substrate. In Table 1, H, M and L represent a layer with a high refractive index, a layer with a medium refractive index and a layer with a low refractive index, respectively. Numbers on the right of H, M and L represent thicknesses (nm) of the respective layers (films). In this example, $TiO_2$, $Al_2O_3$ and $MgF_2$ were used as the layers with the high, medium and low refractive indexes, respectively.

The film structure such as the abovementioned first film portion having the optical characteristic of a high transmittance for P-polarized light in the R, G and B bands, a low transmittance for S-polarized light in the R and G bands, and a high transmittance for S-polarized light in the B band is well known. An exemplary film satisfies the Brewster's angle determined from the refractive index of a multilayer film for P-polarized light and serves as a dichroic filter for entering S-polarized light. Another exemplary film can also be realized by adjusting the cut-off wavelengths of S-polarized light and P-polarized light of a dichroic filter.

Figure 4:
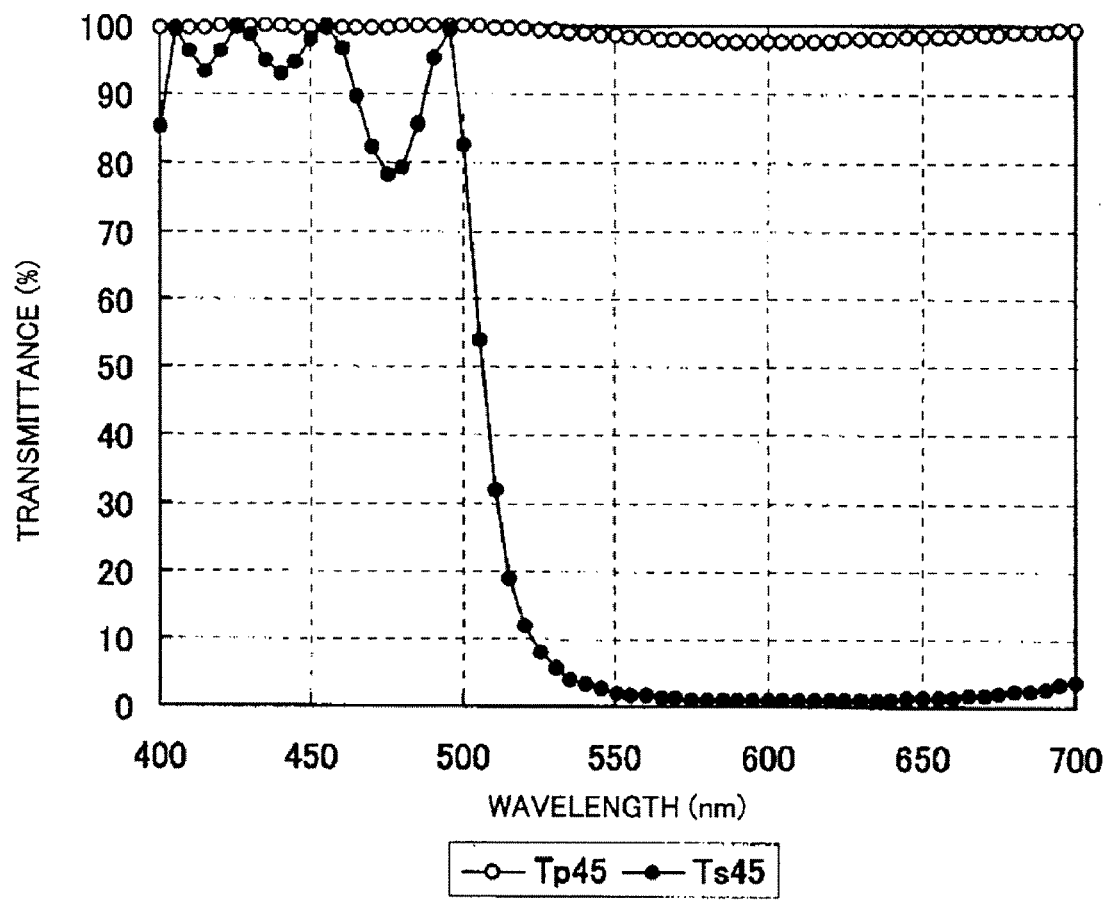
FIG. 4 is a graph showing the simulation result of the spectral transmittance of part of a polarization beam splitting film in the wavelength-selective polarization conversion element used in Embodiment 1.

FIG. 4 shows a simulation result of the spectral transmittance characteristic of "Sub|(108M 100H)$^5$|Ad" as an example of the multilayer film forming the first film portion. "Sub" and "Ad" show a substrate and an adhesive, respectively. In FIG. 4, Tp45 represents the transmittance for P-polarized light entering the polarization beam splitting film 32 at an incident angle of 45 degrees. Ts45 represents the transmittance for S-polarized light entering the polarization beam splitting film 32 at an incident angle of 45 degrees. These notations are also used in the following simulation results.

On the other hand, the film structure such as the abovementioned second film portion having the optical characteristic of a high transmittance for P-polarized light in the R and G bands, a low transmittance for P-polarized light in the B band, and a high transmittance for S-polarized light in the R, G and B bands has not conventionally been known. However, our studies have showed that many film structures can realize those transmittances.

Figure 5:
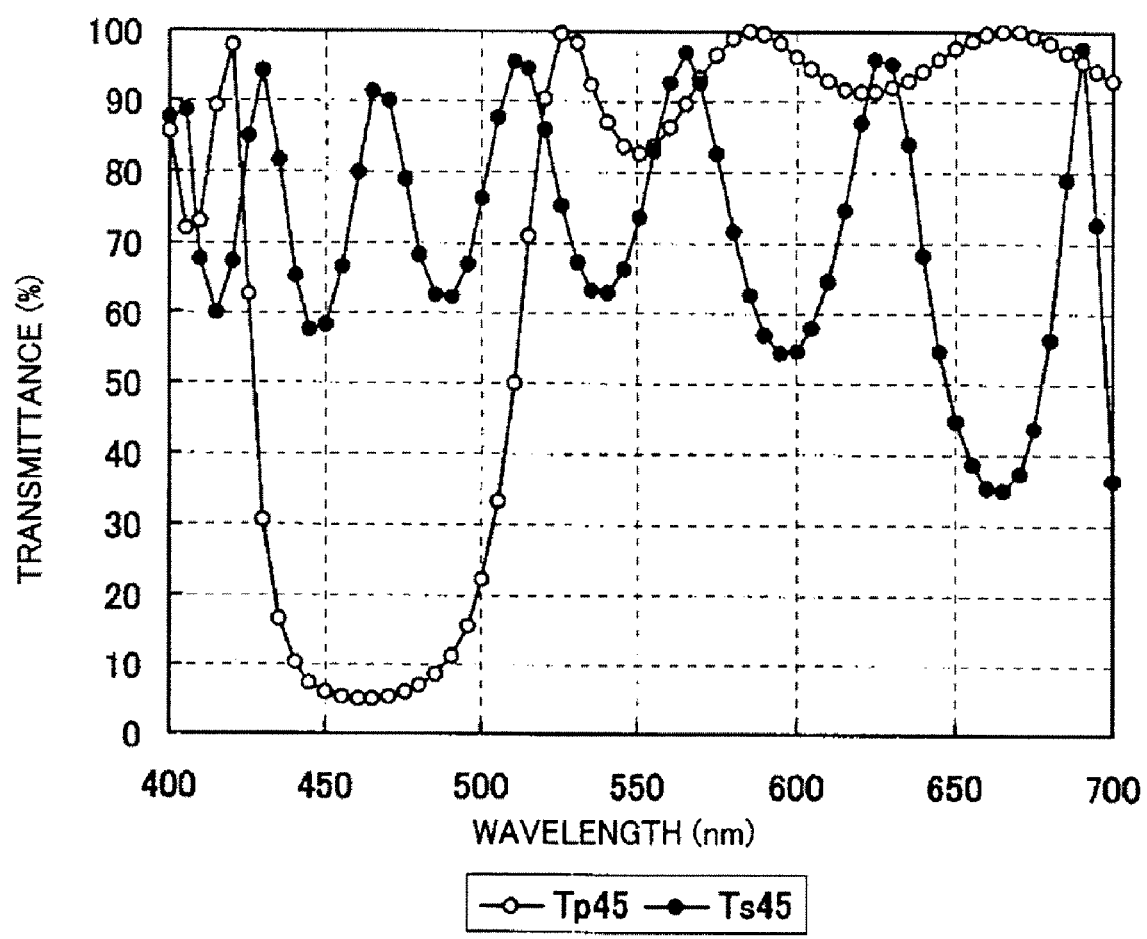
FIG. 5 is a graph showing the simulation result of the spectral transmittance of part of the polarization beam splitting film in the wavelength-selective polarization conversion element used in Embodiment 1.

FIG. 5 shows a simulation result of the spectral transmittance characteristic of "Sub|(116M 171L 115M 75H)$^5$|Ad" as an example of the multilayer film forming the second film portion. In the second film portion shown in the example, the transmittance for S-polarized light is lower than 50% at wavelengths of 645 nm or higher in the R band. However, this is permissible in view of the characteristic of the polarization beam splitting film 32 which should be provided eventually in Embodiment 1. From a different viewpoint, it is essential only that the transmittance for S-polarized light in the R band is higher than the transmittance for S-polarized light in the R band (and the G band) in the first film portion.

The example of the film structure of the polarization beam splitting film 32 shown in Table 1 is provided by laminating the two film portions and optimizing the film thickness in order to reduce ripples in the transmission band and the reflection band of P-polarized light and S-polarized light. A first layer to a thirty-second layer correspond to the first film portion, and a thirty-third layer to a forty-second layer correspond to the second film portion. Since the film portions were laminated and then optimized as a whole, the respective film portions do not have completely separated optical characteristics.

Figure 6:
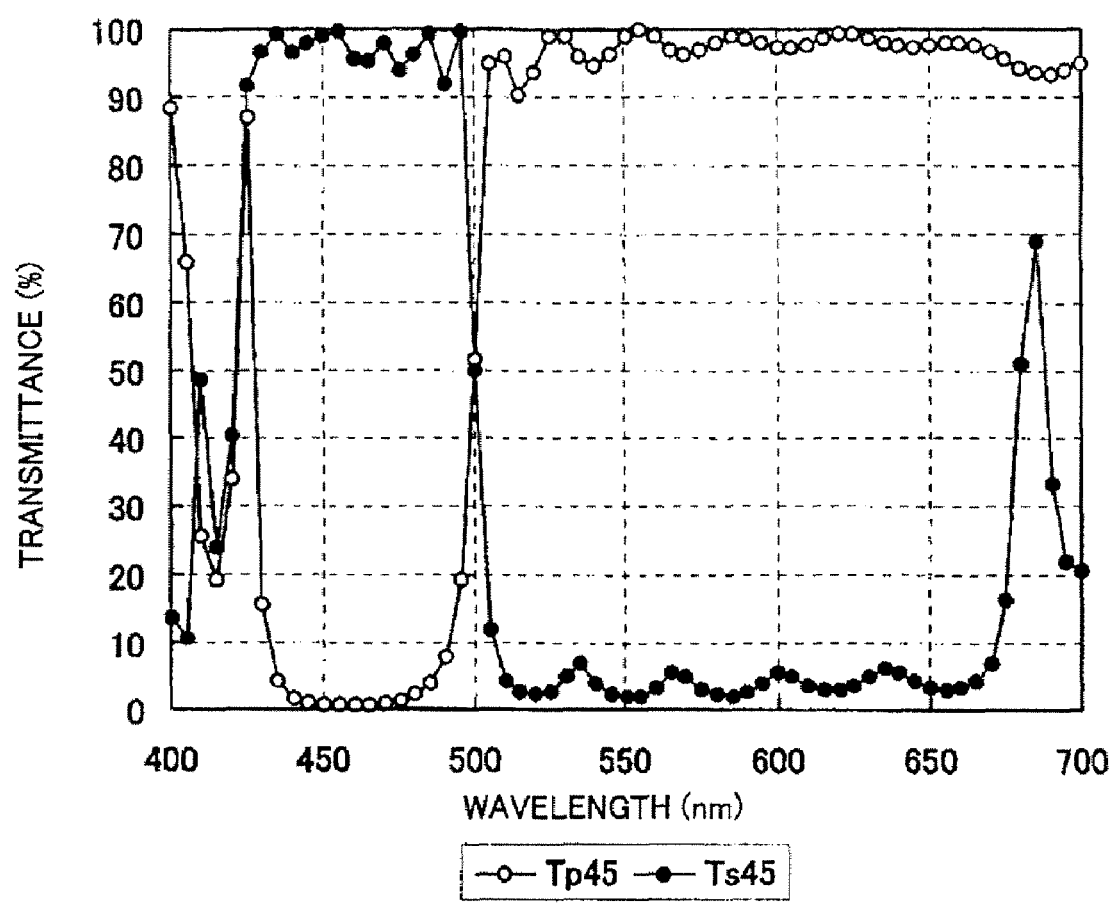
FIG. 6 is a graph showing the simulation result of the spectral transmittance of the polarization beam splitting film in the wavelength-selective polarization conversion element used in Embodiment 1.

FIG. 6 shows the simulation result of the transmittance characteristic of the polarization beam splitting film 32 shown in Table 1.

As shown in FIG. 6, the polarization beam splitting film 32 has the characteristic of a high transmittance for P-polarized light in the R and G bands, a low transmittance for P-polarized light in the B band, a low transmittance for S-polarized light in the R and G bands, and a high transmittance for S-polarized light in the B band.

The material of the glass substrate, the materials of the thin films, the order, the number and the thicknesses of the thin films shown in Table 1 are only illustrative, and the structure of the polarization beam splitting film of the present invention is not limited thereto.

Next, description will be made of the reason why the wavelength-selective polarization conversion element 5 is placed between the second lens array 4 and the condenser lens 6 in Embodiment 1. The lens arrays 3 and 4 have the function of dividing the collimated luminous flux emerging from the parabolic reflector 2 into the plurality of luminous fluxes and the function of converging the divided luminous fluxes at positions close to the wavelength-selective polarization conversion element 5, respectively. On the other hand, the condenser lens 6 has the function of gathering (or converging) the divided luminous fluxes emerging from the second lens array 4 such that they overlap with each other on the liquid crystal panels. In this case, the degree of convergence of the divided luminous fluxes by the second lens array 4 toward the wavelength-selective polarization conversion element 5 is smaller than the degree of convergence by the condenser lens 6.

In general, the multilayer film such as the dichroic film and the polarization beam splitting film has a spectral characteristic significantly depending on the incident angle. It can provide a favorable spectral characteristic close to the designed one when light enters it at an incident angle of 45 degrees. However, the spectral characteristic is shifted more as the incident angle is deviated from 45 degrees. In other words, the wavelength bands separated by the multiplayer film are shifted.

As described above, the degree of convergence of the luminous flux by the condenser lens 6 is large. If the wavelength-selective polarization conversion element 5 is placed closer to the liquid crystal panels than the condenser lens 6, the spectral characteristic of the polarization beam splitting film 32 forming part of the wavelength-selective polarization conversion element 5 is shifted. This causes a large amount of light in an unintended polarization direction to be contained in the light in the respective bands entering the associated liquid crystal panels, resulting in a reduction in contrast of a projected image.

For this reason, in Embodiment 1, the wavelength-selective polarization conversion element 5 is placed between the second lens array 4 and the condenser lens 6 to allow the less converged luminous fluxes (that is, the luminous fluxes close to collimated light) to enter the polarization conversion element 5. This can achieve a favorable spectral characteristic of the polarization beam splitting film 32 forming part of the wavelength-selective polarization conversion element 5. Thus, according to Embodiment 1, the proper spectral characteristic attained by the wavelength-selective polarization conversion element 5 can be used to provide a projected image with high contrast.

The abovementioned reason why the wavelength-selective polarization conversion element is placed between the second lens array and the condenser lens applies to Embodiments 2 to 5 described below.

Embodiment 2

Figure 7:
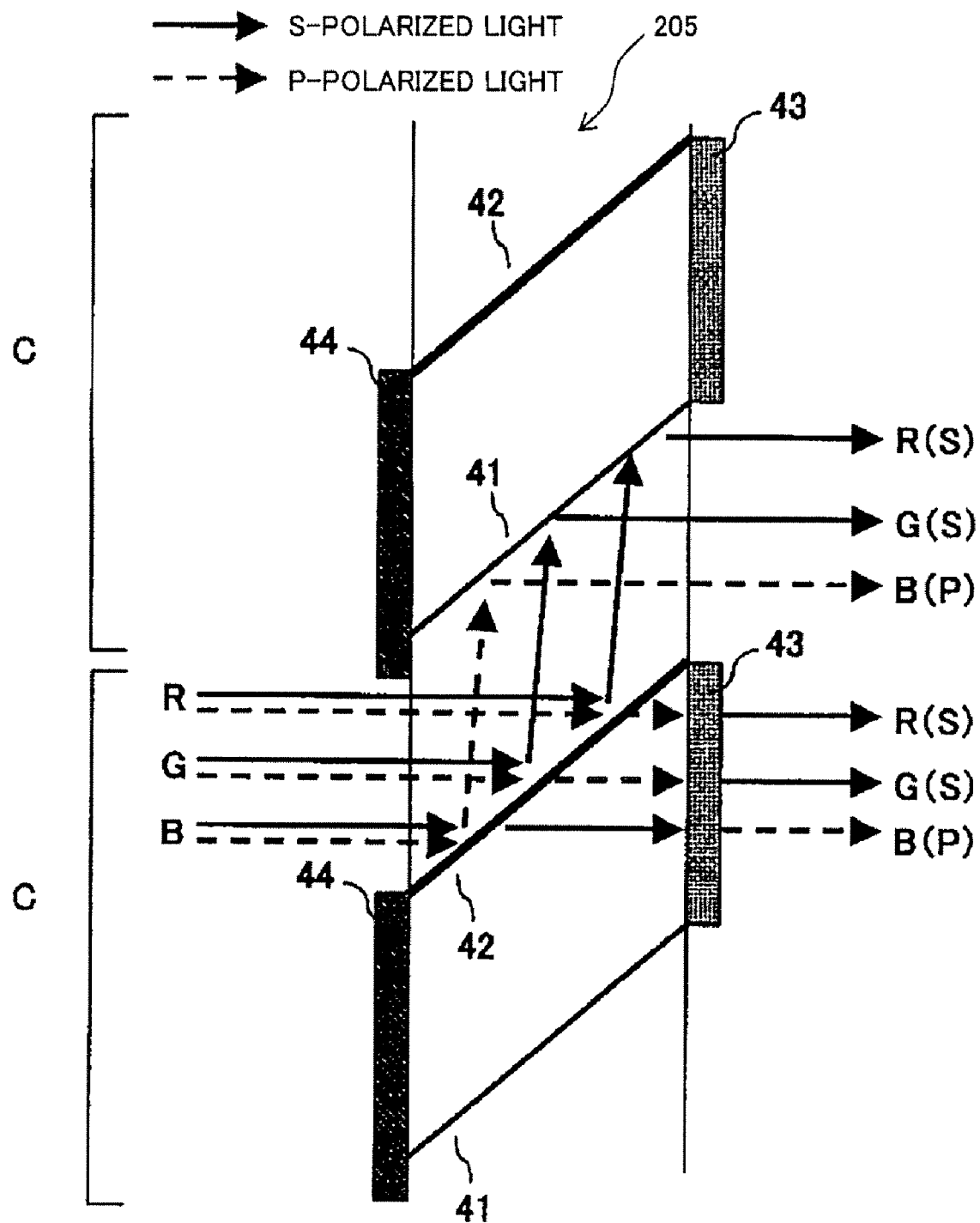
FIG. 7 is a schematic diagram showing the structure of a wavelength-selective polarization conversion element which is Embodiment 2 of the present invention.

The FIG. 7 shows a wavelength-selective polarization conversion element 205 which is Embodiment 2 of the present invention. The wavelength-selective polarization conversion element 205 is used in the same projection display optical system as that shown in FIG. 1 in Embodiment 1, and constituent components of the projection display optical system other than the wavelength-selective polarization conversion element are designated with the same reference numerals as those in Embodiment 1. In Embodiment 2, similarly to Embodiment 1, P-polarized light and S-polarized light are used as polarized light with a first polarization direction and polarized light with a second polarization direction, respectively.

The structure and the optical effects of the wavelength-selective polarization conversion element 205 of Embodiment 2 will be described in detail. The wavelength-selective polarization conversion element 205 is formed of a plurality of polarization conversion cells C having the same structure and provided for a plurality of lens cells forming each of fly-eye lenses 3 and 4. In the entrance surface for light of each of the polarization conversion cells C, a light-shield plate 44 is provided for blocking entrance of light in the area from the position of a wavelength-selective polarization beam splitting film 42, later described, to the position of a reflecting film 41 below that film 42. This causes light to enter only the area between the wavelength-selective polarization beam splitting film 42 and the reflecting film 41 placed above that film 42 in the entrance surface of each polarization conversion cell C. Reference numeral 43 shows a phase plate. The wavelength-selective polarization beam splitting film 42 will hereinafter be referred to simply as the polarization beam splitting film.

The polarization beam splitting film 42 is placed such that its normal forms an angle larger than 45 degrees, for example 50 degrees, with respect to the direction of entrance of light (from left to right in FIG. 7). The reflecting film 41 is placed in parallel with the polarization beam splitting film 42. With the inclination of the normal of the polarization beam splitting film 42 at an angle larger than 45 degrees, the light-shield plate 44 is extended to below the position of the reflecting film 41 in the entrance surface of each polarization conversion cell C. This allows light to enter the wavelength-selective polarization conversion element 205 only through the area between the reflecting film 41 and the polarization beam splitting film 42 in the entrance surface of each polarization conversion cell C.

The polarization beam splitting film 42 is actually formed as a multilayer film provided on a surface of a substrate made of glass or acrylic which is a parallel plate. The phase plate 43 is formed as a film and provided in the area from the position of the reflecting film 41 to the position of the polarization beam splitting film 42 above that film 41 in the emergence surface of the wavelength-selective polarization conversion element 205.

As shown in FIG. 3, in Embodiment 2, the phase plate 43 may be formed on the emergence side of a substrate having the polarization beam splitting film 42 formed on the entrance side, similarly to Embodiment 1.

In Embodiment 2, the polarization beam splitting film 42 has a characteristic in which the transmittance for P-polarized light in the R and G bands is 100% or close to 100% (higher than 50%) and the transmittance for P-polarized light in the B band is 0% or close to 0% (lower than 50%). The polarization beam splitting film 42 also has a characteristic in which the transmittance for S-polarized light in the R and G bands is 0% or close to 0% (lower than 50%) and the transmittance for S-polarized light in the B band is 100% or close to 100% (higher than 50%).

The phase plate 43 is a half-wave plate and has a function of rotating the polarization direction of entering linearly polarized light by 90 degrees.

White-color non-polarized light enters the wavelength-selective polarization conversion element 205 having the abovementioned structure from the left in FIG. 7. Of the non-polarized light, P-polarized light in the R and G bands is transmitted through the polarization beam splitting film 42 and converted into S-polarized light by being transmitted through the phase plate 43, and the resulting S-polarized light emerges from the wavelength-selective polarization conversion element 205. S-polarized light in the R and G bands is reflected by the polarization beam splitting film 42, reflected by the reflecting film 41, and then emerges from the wavelength-selective polarization conversion element 205 without any change.

P-polarized light in the B band is reflected by the polarization beam splitting film 42, reflected by the refection film 41, and then emerges from the wavelength-selective polarization conversion element 205 without any change. S-polarized light in the B band is transmitted through the polarization beam splitting film 42 and converted into P-polarized light by being transmitted through the phase plate 43, and the resulting P-polarized light emerges from the wavelength-selective polarization conversion element 205.

In this manner, the white-color non-polarized light enters the wavelength-selective polarization conversion element 205 formed as the single element and is converted into the S-polarized light in the R and G bands and the P-polarized light in the B band, and they emerge from the element 205. Thus, the similar effects to those described in Embodiment 1 can be achieved.

Table 1 shows an example of the multilayer film structure of the polarization beam splitting film 42 having an optical characteristic of a high transmittance for P-polarized light in the R and G bands, a low transmittance for P-polarized light in the B band, a low transmittance for S-polarized light in the R and G bands, and a high transmittance for S-polarized light in the B band. Similarly to Embodiment 1, the example shows the film structure corresponding to that formed by laminating two film portions. A first film portion has an optical characteristic of a high transmittance for P-polarized light in the R, G and B bands, a low transmittance for S-polarized light in the R and G bands, and a high transmittance for S-polarized light in the B band, similarly to that in Embodiment 1. A second film portion has an optical characteristic of a high transmittance for P-polarized light in the R and G bands, a low transmittance for P-polarized light in the B band, and a high transmittance for S-polarized light in the R, G and B bands.

LAL14 manufactured by OHARA INC. was used as the glass substrate. In Table 1, H, M and L and numbers on the right of H, M and L are used in the same manner as those in Embodiment 1. Similarly to the example in Embodiment 1, $TiO_2$, $Al_2O_3$ and $MgF_2$ were used as the layers with the high, medium and low refractive indexes, respectively.

The example of the film structure of the polarization beam splitting film 42 shown in Table 1 is provided by laminating the two film portions and optimizing the film thickness in order to reduce ripples in the transmission bands and the reflection bands of P-polarized light and S-polarized light. A first layer to a thirty-second layer correspond to the first film portion, and a thirty-third layer to a forty-fourth layer correspond to the second film portion. Since the film portions were laminated and then optimized as a whole, the respective film portions do not have completely separated optical characteristics.

Figure 8:
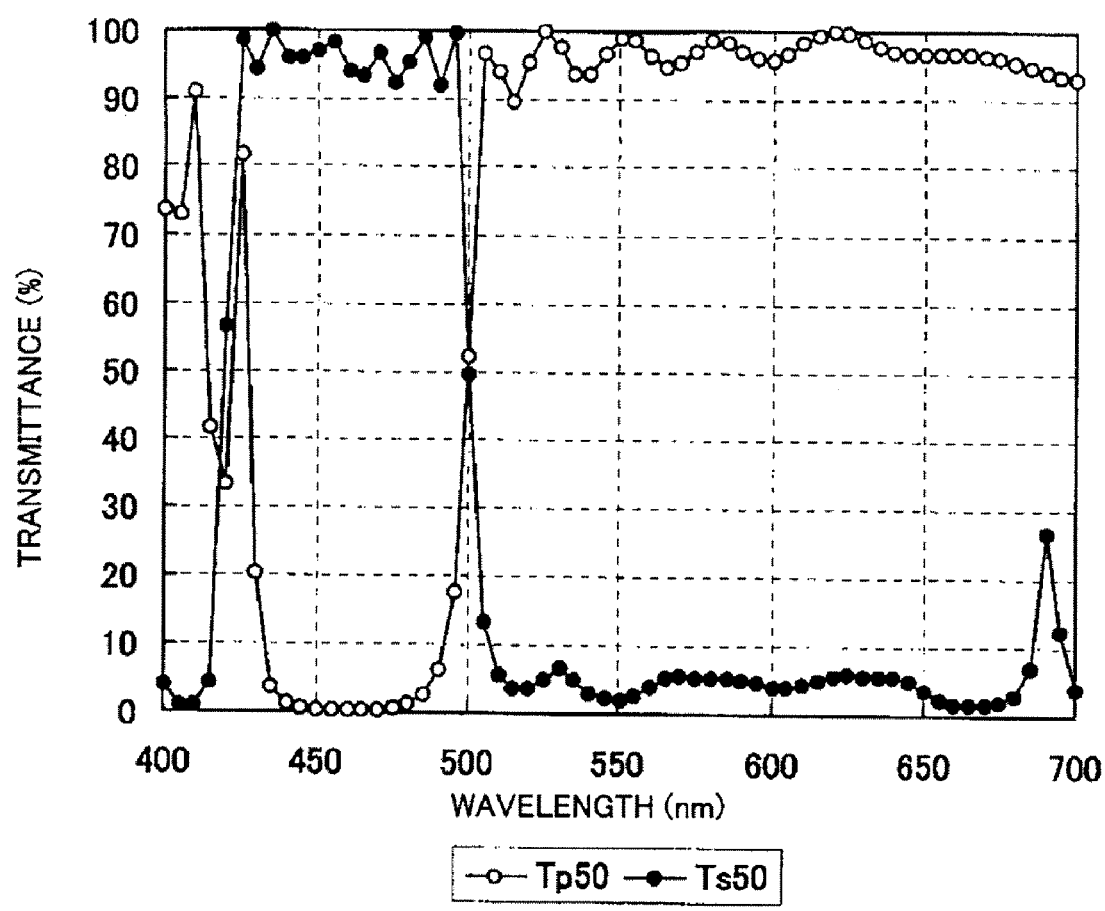
FIG. 8 is a graph showing the simulation result of the spectral transmittance of a polarization beam splitting film in the wavelength-selective polarization conversion element of Embodiment 2.

FIG. 8 shows a simulation result of the transmittance characteristic of the polarization beam splitting film 42 shown in Table 1. In FIG. 8, Tp50 represents the transmittance for P-polarized light entering the polarization beam splitting film 42 at an incident angle of 50 degrees. Ts50 represents the transmittance for S-polarized light entering the polarization beam splitting film 42 at an incident angle of 50 degrees. In this manner, the incident angle on the polarization beam splitting film is not limited to 45 degrees.

The material of the glass substrate, the materials of the thin films, the order, the number and the thicknesses of the thin films shown in Table 1 are only illustrative, and the structure of the polarization beam splitting film of the present invention is not limited thereto.

Embodiment 3

Figure 9:
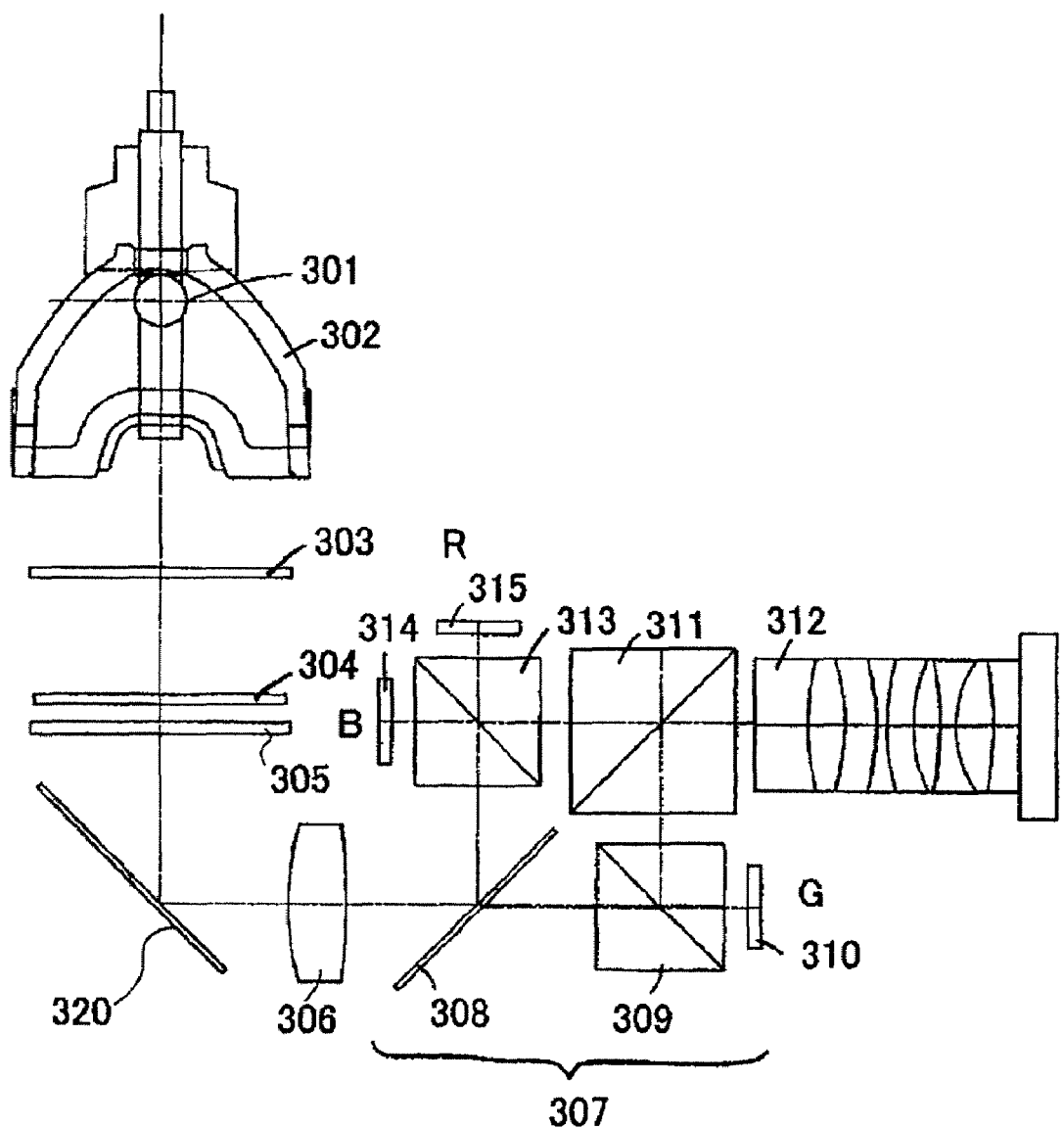
FIG. 9 shows the structures of a projection display optical system and a liquid crystal projector including the projection display optical system, which are Embodiment 3 of the present invention.

FIG. 9 shows the structure of a projection display optical system in which a wavelength-selective polarization conversion element which is Embodiment 3 of the present invention is used as well as the structure of a liquid crystal projector including the projection display optical system.

A luminous flux emitted from a white light source 301 is converted into a collimated luminous flux by a parabolic reflector 302 and then emerges therefrom. The collimated luminous flux is divided into a plurality of luminous fluxes by a first fly-eye lens 303, and the respective divided luminous fluxes are converged. The respective divided luminous fluxes are converged at positions close to a second fly-eye lens 304 and a wavelength-selective polarization conversion element 305 and then form images (secondary images) of the light source.

Each of the fly-eye lenses 303 and 304 is formed of a plurality of lens cells arranged two-dimensionally. Each of the lens cells has a rectangular lens shape similar to a liquid crystal panel which is a surface to be illuminated, later described.

The luminous flux emerging from the second fly-eye lens 304 and entering the wavelength-selective polarization conversion element 305 is non-polarized light containing P-polarized light which is linearly polarized light with a first polarization direction and S-polarized light which is linearly polarized light with a second polarization direction.

The wavelength-selective polarization conversion element 305 converts light in the R and G bands of the divided luminous fluxes emerging from the second fly-eye lens 304 into P-polarized light. The R and G bands are first and second wavelength regions, respectively. It also converts light in the B band, which is a third wavelength region, into S-polarized light.

The P-polarized light in the R and G bands and the S-polarized light in the B band that emerged from the wavelength-selective polarization conversion element 305 are reflected by a mirror 320. Then, the divided luminous fluxes are gathered by a condenser lens 306 and overlapped with each other to illuminate reflective liquid crystal panels 315, 310 and 314 for the R, G and B bands (R, G and B liquid crystal panels) through a color separation/combination optical system 307.

The color separation/combination optical system 307 includes a dichroic mirror 308 which reflects the light in the R and B bands and transmits the light in the G band, of the polarized light transmitted through the condenser lens 306. The polarized light in the G band is transmitted through the dichroic mirror 308, transmitted through a first polarization beam splitter 309 and enters the reflective G liquid crystal panel 310.

The image light (polarized light) from the G liquid crystal panel 310 is reflected by the first polarization beam splitter 309, reflected by a wavelength-selective polarization beam splitter 311 and projected onto a screen, not shown, by a projection lens 312. The wavelength-selective polarization beam splitter 311 transmits S-polarized light in the R band, reflects S-polarized light in the G band and reflects S-polarized light in the B band. Further, it transmits P-polarized light in the B band.

On the other hand, of the polarized light in the R and B bands reflected by the dichroic mirror 8, the polarized light in the R band is transmitted through a second polarization beam splitter 313, and the polarized light in the B band is reflected by the second polarization beam splitter 313. The polarized light in the R band and the polarized light in the B band that emerged from the second polarization beam splitter 313 reach the reflective R liquid crystal panel 315 and the reflective B liquid crystal panel 314, respectively.

The polarized light in the R band reflected and modulated by the R liquid crystal panel 315 is reflected by the second polarization beam splitter 313. The polarized light in the B band reflected and modulated by the B liquid crystal panel 314 is transmitted through the second polarization beam splitter 313.

Then, the light in the R and B bands is transmitted through the wavelength-selective polarization beam splitter 311 and projected onto the screen by the projection lens 312. In this manner, the projected image of full color (RGB) is displayed on the screen.

Next, the structure and the optical effects of the abovementioned wavelength-selective polarization conversion element 305 will be described in detail with reference to FIG. 10. The wavelength-selective polarization conversion element 305 is formed of a plurality of polarization conversion cells C having the same structure and provided for the plurality of lens cells forming each of the fly-eye lenses 303 and 304. In the entrance surface for light of each of the polarization conversion cells C, a light-shield plate 34 is provided for blocking entrance of light in the area from the position of a wavelength-selective polarization beam splitting film 32, later described, to the position of a reflecting film 31 below that film 32. This causes light to enter the wavelength-selective polarization conversion element 305 only through the area between the wavelength-selective polarization beam splitting film 32 and the reflecting film 31 placed above that film 32 in the entrance surface of each polarization conversion cell C. Reference numeral 36 shows a phase plate. The wavelength-selective polarization beam splitting film 32 will hereinafter be referred to simply as the polarization beam splitting film.

Figure 10:
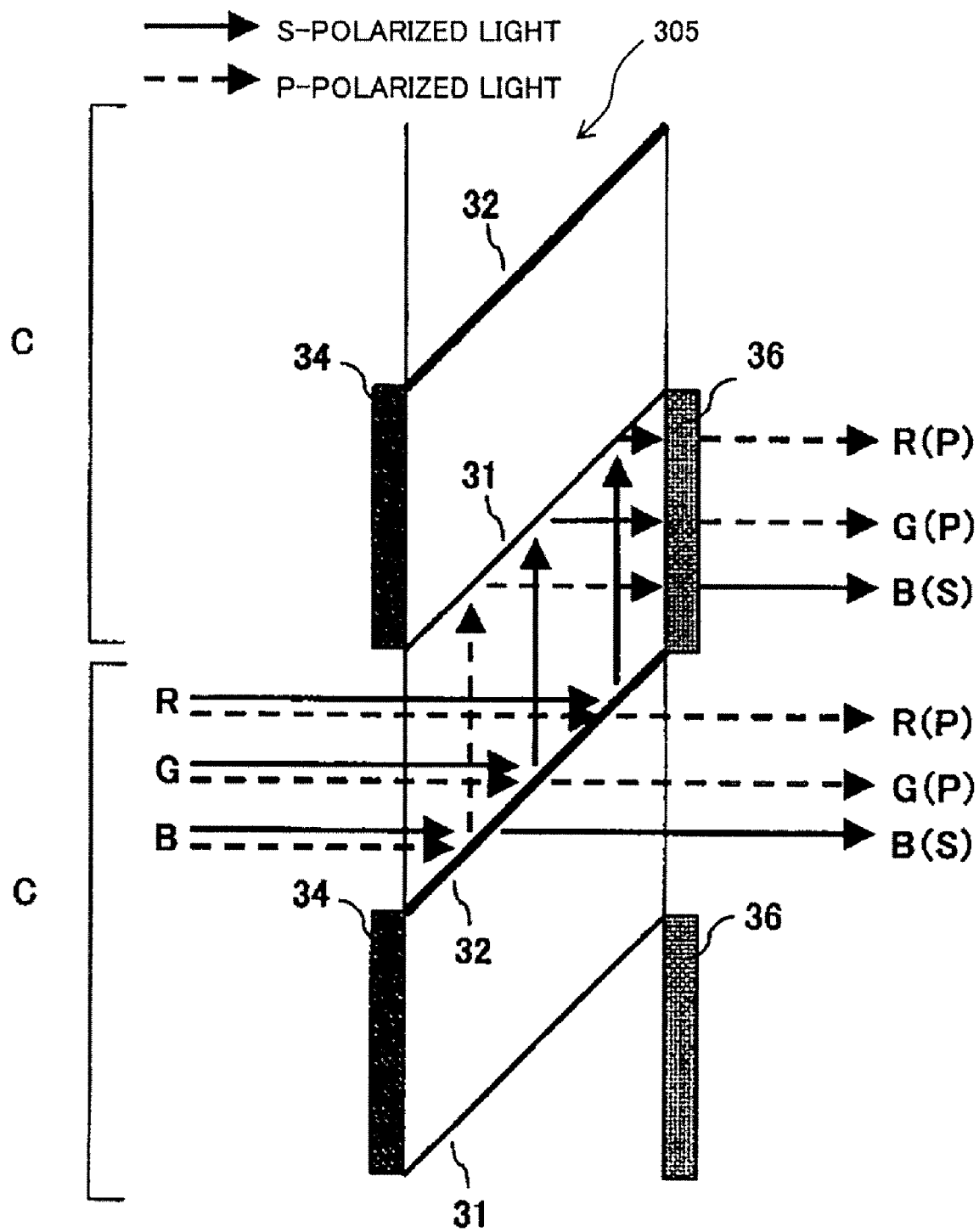
FIG. 10 is a schematic diagram showing the structure of a wavelength-selective polarization conversion element used in Embodiment 3.

The polarization beam splitting film 32 is placed at an inclination of 45 degrees with respect to the direction of entrance of light (from left to right in FIG. 10). The reflecting film 31 is disposed in parallel with the polarization beam splitting film 32. The polarization beam splitting film 32 is actually formed as a multilayer film provided on a surface of a substrate made of glass or acrylic which is a parallel plate.

The phase plate 36 is formed as a film and provided in the area from the position of the polarization beam splitting film 32 to the position of the reflecting film 31 below that film 32 in the emergence surface of the wavelength-selective polarization conversion element 305.

As shown in FIG. 3, the phase plate 36 may be formed on the emergence side of a substrate having the polarization beam splitting film 32 formed on the entrance side.

The same polarization beam splitting film 32 as that in Embodiment 1 is used in Embodiment 3. The phase plate 36 is a half-wave plate and has a function of rotating the polarization direction of entering linearly polarized light by 90 degrees, which is similar to the phase plate 33 in Embodiment 1.

White-color non-polarized light enters the wavelength-selective polarization conversion element 305 of the abovementioned structure from the left in FIG. 10. Of the non-polarized light, P-polarized light in the R and G bands is transmitted through the polarization beam splitting film 32 and emerges from the wavelength-selective polarization conversion element 305. S-polarized light in the R and G bands is reflected by the polarization beam splitting film 32, reflected by the reflecting film 31 and converted into P-polarized light by being transmitted through the phase plate 36, and the resulting P-polarized light emerges from the wavelength-selective polarization conversion element 305.

P-polarized light in the B band is reflected by the polarization beam splitting film 32, reflected by the reflecting film 31 and converted into S-polarized light by being transmitted through the phase plate 36, and the resulting S-polarized light emerges from the wavelength-selective polarization conversion element 305. S-polarized light in the B band is transmitted through the polarization beam splitting film 32 and emerges from the wavelength-selective polarization conversion element 305.

In this manner, the white-color non-polarized light enters the wavelength-selective polarization conversion element 305 formed as the single element and is converted into the P-polarized light in the R and G bands and the S-polarized light in the B band, and they emerge from the element 305. Thus, the similar effects described in Embodiment 1 can be achieved.

Embodiment 3 shows the incident angle of the luminous flux of 45 degrees on the polarization beam splitting film 32, but the present invention is not limited to the incident angle of 45 degrees as in Embodiment 2. The material of the glass substrate on which the polarization beam splitting film is formed, the materials of the thin films, the order, the number and the thicknesses of the thin films are not limited to those used in Embodiment 1 shown in Table.

Embodiment 4

Figure 11:
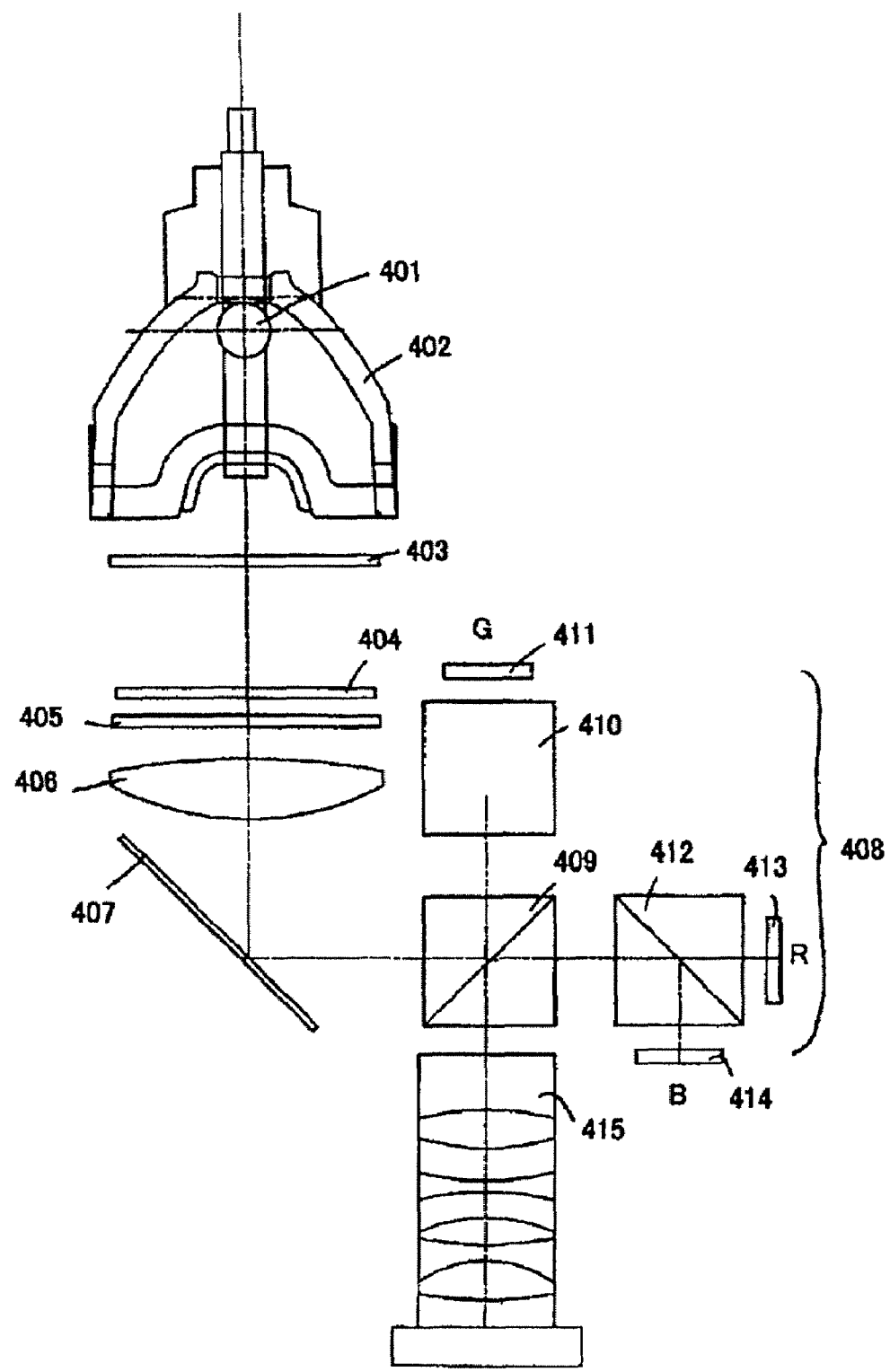
FIG. 11 shows the structures of a projection display optical system and a liquid crystal projector including the projection display optical system, which are Embodiment 4 of the present invention.

FIG. 11 shows the structure of a projection display optical system in which a wavelength-selective polarization conversion element which is Embodiment 4 of the present invention is used as well as the structure of a liquid crystal projector including the projection display optical system.

A luminous flux emitted from a white light source 401 is converted into a collimated luminous flux by a parabolic reflector 402 and emerges therefrom. The collimated luminous flux is divided into a plurality of luminous fluxes by a first fly-eye lens 403, and the respective divided luminous fluxes are converged. The respective divided luminous fluxes are converged at positions close to a second fly-eye lens 404 and a wavelength-selective polarization conversion element 405 and then form images (secondary images) of the light source.

Each of the fly-eye lenses 403 and 404 is formed of a plurality of lens cells arranged two-dimensionally. Each of the lens cells has a rectangular lens shape similar to a liquid crystal panel which is a surface to be illuminated, later described.

The luminous flux emerging from the second fly-eye lens 404 and entering the wavelength-selective polarization conversion element 405 is non-polarized light containing P-polarized light which is linearly polarized light with a first polarization direction and S-polarized light which is linearly polarized light with a second polarization direction.

The wavelength-selective polarization conversion element 405 converts light in the R and B bands of the divided luminous fluxes emerging from the second fly-eye lens 404 into P-polarized light. The R and B bands are first and third wavelength regions. It also converts light in the G band, which is a second wavelength region, into S-polarized light.

The P-polarized light in the R and B bands and the S-polarized light in the G band emerge from the wavelength-selective polarization conversion element 405 and are gathered by a condenser lens 406. Then, the divided luminous fluxes are reflected by a mirror 307 and overlapped with each other to illuminate reflective liquid crystal panels 413, 414 and 411 for the R, G and B bands (R, G and B liquid crystal panels) through a color separation/combination optical system 408.

The color separation/combination optical system 408 includes a polarization beam splitter 409 which transmits the light in the R and B bands and reflects the light in the G band, of the polarized light. The polarized light in the G band is reflected by the polarization beam splitter 409, transmitted through a glass block 410 and enters the reflective G liquid crystal panel 411.

The image light (polarized light) from the G liquid crystal panel 411 is transmitted through the glass block 410, transmitted through the polarization beam splitter 409 and projected onto a screen, not shown, by a projection lens 415.

On the other hand, of the polarized light in the R and B bands transmitted through the polarization beam splitter 409, the polarized light in the B band is reflected by a dichroic prism 412, and the polarized light in the R band is transmitted through the dichroic prism 412. The polarized light in the B band and the polarized light in the R band that emerged from the dichroic prism 412 reach the reflective B liquid crystal panel 414 and the reflective R liquid crystal panel 413, respectively.

The polarized light in the B band reflected and modulated by the B liquid crystal panel 414 is reflected by the dichroic prism 412. The polarized light in the R band reflected and modulated by the R liquid crystal panel 413 is transmitted through the dichroic prism 412. Then, the light in the B and R bands is reflected by the polarization beam splitter 409 and projected onto the screen by the projection lens 415. In this manner, the projected image of full color (RGB) is displayed on the screen.

Next, the structure and the optical effects of the abovementioned wavelength-selective polarization conversion element 405 will be described in detail with reference to FIG. 12. The wavelength-selective polarization conversion element 405 is formed of a plurality of polarization conversion cells C having the same structure and provided for the plurality of lens cells forming each of the fly-eye lenses 403 and 404. In the entrance surface for light of each of the polarization conversion cells C, a light-shield plate 54 is provided for blocking entrance of light in the area from the position of a wavelength-selective polarization beam splitting film 52, later described, to the position of a reflecting film 51 below the film 52. This causes light to enter the wavelength-selective polarization conversion element 405 only through the area between the polarization beam splitting film 52 and the reflecting film 51 placed above that film 52 in the entrance surface of each polarization conversion cell C. Reference numeral 53 shows a phase plate.

Figure 12:
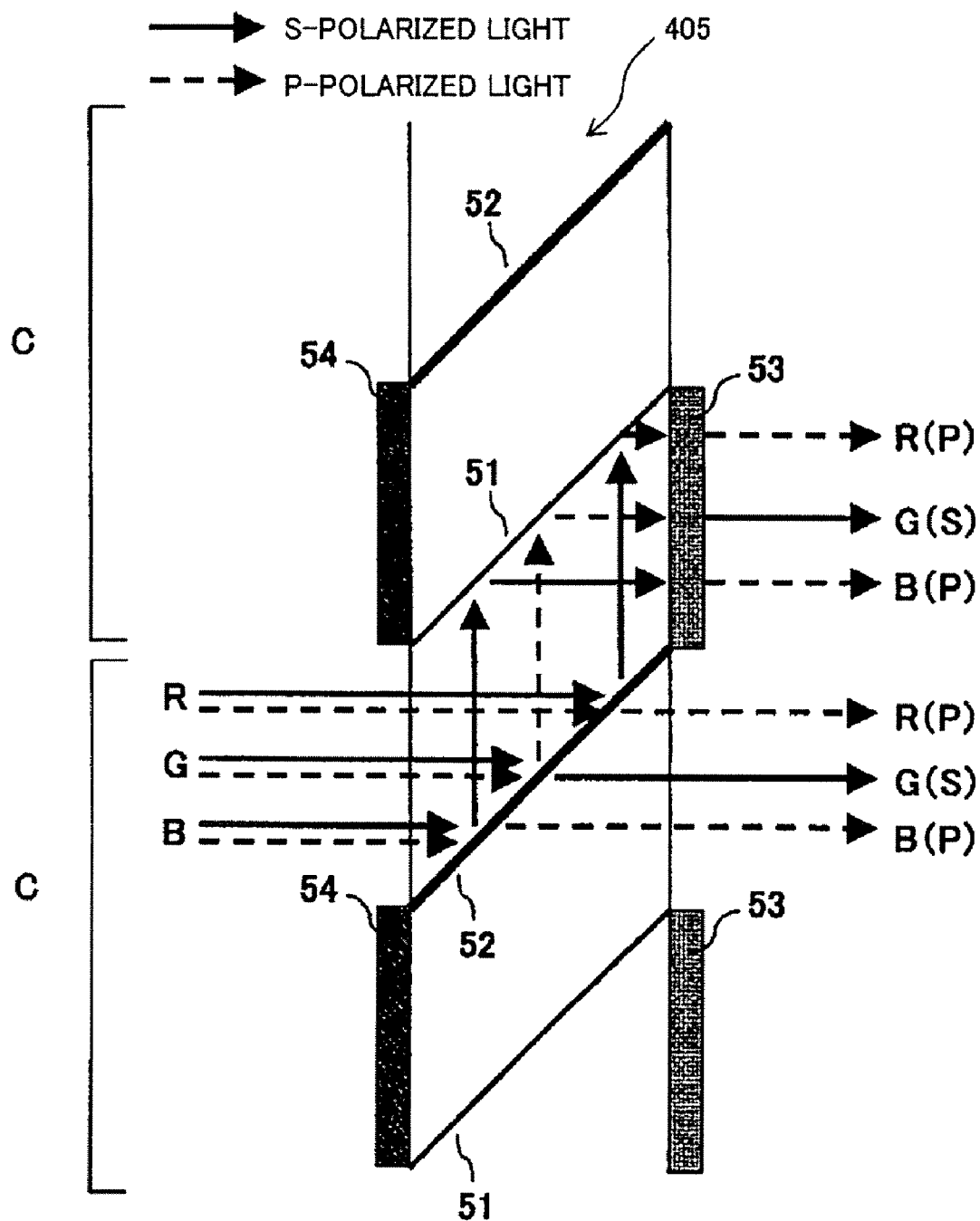
FIG. 12 is a schematic diagram showing the structure of a wavelength-selective polarization conversion element used in Embodiment 4.

The polarization beam splitting film 52 is placed at an inclination of 45 degrees with respect to the direction of entrance of light (from left to right in FIG. 12). The reflecting film 51 is disposed in parallel with the polarization beam splitting film 52. The polarization beam splitting film 52 is actually formed as a multilayer film provided on a surface of a substrate made of glass or acrylic which is a parallel plate.

The phase plate 53 is formed as a film and provided in the area from the position of the polarization beam splitting film 52 to the position of the reflecting film 51 above that film 52 in the emergence surface of the wavelength-selective polarization conversion element 405.

As shown in FIG. 3, the phase plate 53 may be formed on the emergence side of a substrate having the polarization beam splitting film 52 formed on the entrance side.

The polarization beam splitting film 52 of Embodiment 4 has a characteristic in which the transmittance for P-polarized light in the R and B bands is 100% or close to 100% (higher than 50%) and the transmittance for P-polarized light in the G band is 0% or close to 0% (lower than 50%). The polarization beam splitting film 52 also has a characteristic in which the transmittance for S-polarized light in the R and B bands is 0% or close to 0% (lower than 50%) and the transmittance for S-polarized light in the G band is 100% or close to 100% (higher than 50%).

The phase plate 53 is a half-wave plate and has a function of rotating the polarization direction of entering linearly polarized light by 90 degrees.

White-color non-polarized light enters the wavelength-selective polarization conversion element 405 of the abovementioned structure from the left in FIG. 12. Of the non-polarized light, P-polarized light in the R and B bands is transmitted through the polarization beam splitting film 52 and emerges from the wavelength-selective polarization conversion element 405. S-polarized light in the R and B bands is reflected by the polarization beam splitting film 52, reflected by the reflecting film 51 and converted into P-polarized light by being transmitted through the phase plate 53, and the resulting P-polarized light emerges from the wavelength-selective polarization conversion element 405.

P-polarized light in the G band is reflected by the polarization beam splitting film 52, reflected by the reflecting film 51 and converted into S-polarized light by being transmitted through the phase plate 53, and the resulting S-polarized light emerges from the wavelength-selective polarization conversion element 405. S-polarized light in the G band is transmitted through the polarization beam splitting film 52 and emerges from the wavelength-selective polarization conversion element 405.

In this manner, the white-color non-polarized light enters the wavelength-selective polarization conversion element 405 formed as the single element and is converted into the P-polarized light in the R and B bands and the S-polarized light in the G band, and they emerge from the element 405. Thus, the similar effects described in Embodiment 1 can be achieved.

Table 1 shows an example of the multilayer film structure of the polarization beam splitting film 52 having the optical characteristic of a high transmittance for P-polarized light and a low transmittance for S-polarized light in the R and B bands, and a low transmittance for P-polarized light and a high transmittance for S-polarized light in the G band.

Similarly to Embodiment 1, the example in Table 1 shows the film structure corresponding to that formed by laminating two film portions. A first film portion has an optical characteristic of a high transmittance for P-polarized light in the R, G and B bands, a low transmittance for S-polarized light in the R and B bands, and a high transmittance for S-polarized light in the G band. A second film portion has an optical characteristic of a high transmittance for P-polarized light in the R and B bands, a low transmittance for P-polarized light in the G band, and a high transmittance for S-polarized light in the R, G and B bands.

PBH56 manufactured by OHARA INC. was used as the glass substrate. In Table 1, H, M and L and numbers on the right of H, M and L are used in the same manner as those in Embodiment 1. Similarly to the example in Embodiment 1, $TiO_2$, $Al_2O_3$ and $MgF_2$ were used as the layers with the high, medium and low refractive indexes, respectively.

The example of the film structure of the polarization beam splitting film 52 shown in Table 1 is provided by laminating the two film portions and optimizing the film thickness in order to reduce ripples in the transmission bands and the reflection bands of P-polarized light and S-polarized light. A first layer to a twenty-eighth layer correspond to the first film portion, and a twenty-ninth layer to a fifty-second layer correspond to the second film portion. Since the film portions were laminated and then optimized as a whole, the respective film portions do not have completely separated optical characteristics.

Figure 13:
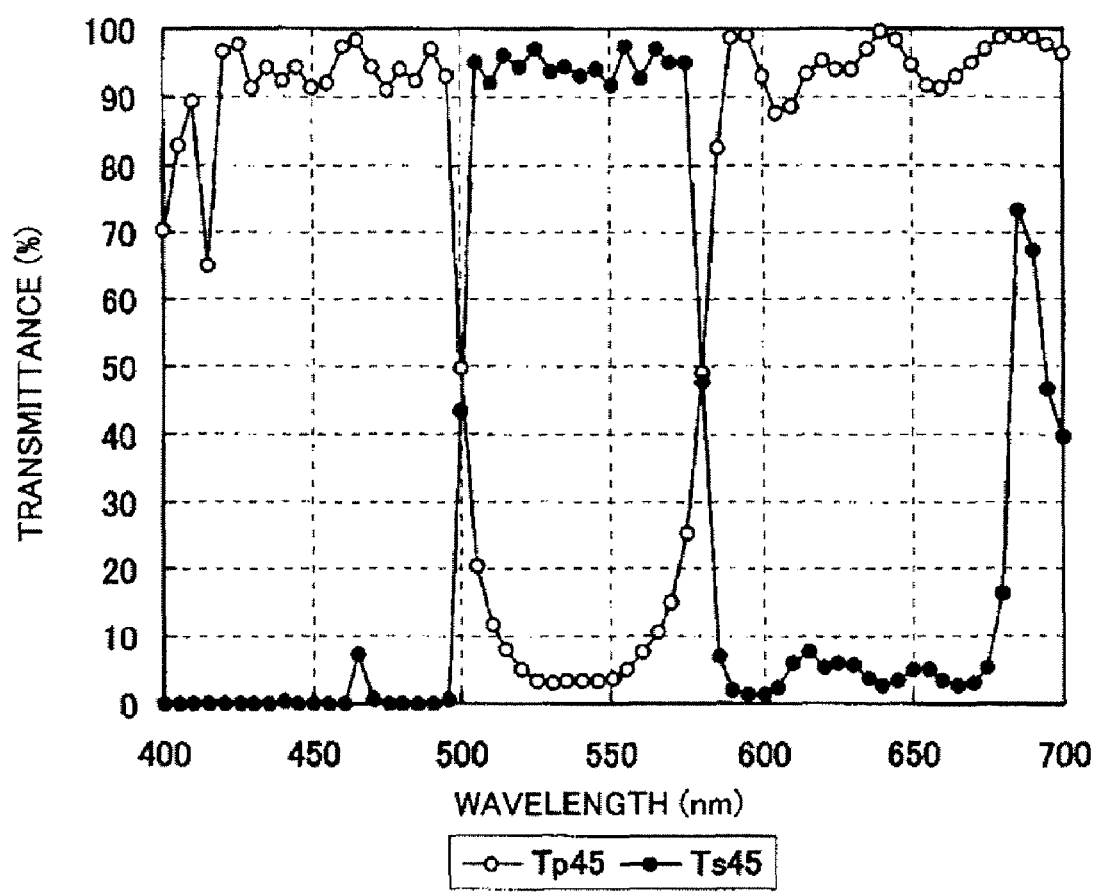
FIG. 13 is a graph showing the simulation result of the spectral transmittance of a polarization beam splitting film in the wavelength-selective polarization conversion element used in Embodiment 4.

FIG. 13 shows a simulation result of the transmittance characteristic of the polarization beam splitting film 52 shown in Table 1. In FIG. 13, Tp45 represents the transmittance for P-polarized light entering the polarization beam splitting film 52 at an incident angle of 45 degrees. Ts45 represents the transmittance for S-polarized light entering the polarization beam splitting film 52 at an incident angle of 45 degrees.

As described in Embodiment 2, the incident angle on the polarization beam splitting film 52 is not limited to 45 degrees. The material of the glass substrate, the materials of the thin films, the order, the number and the thicknesses of the thin films shown in Table 1 are not limited to those shown in Table 1.

Embodiment 5

Figure 14:
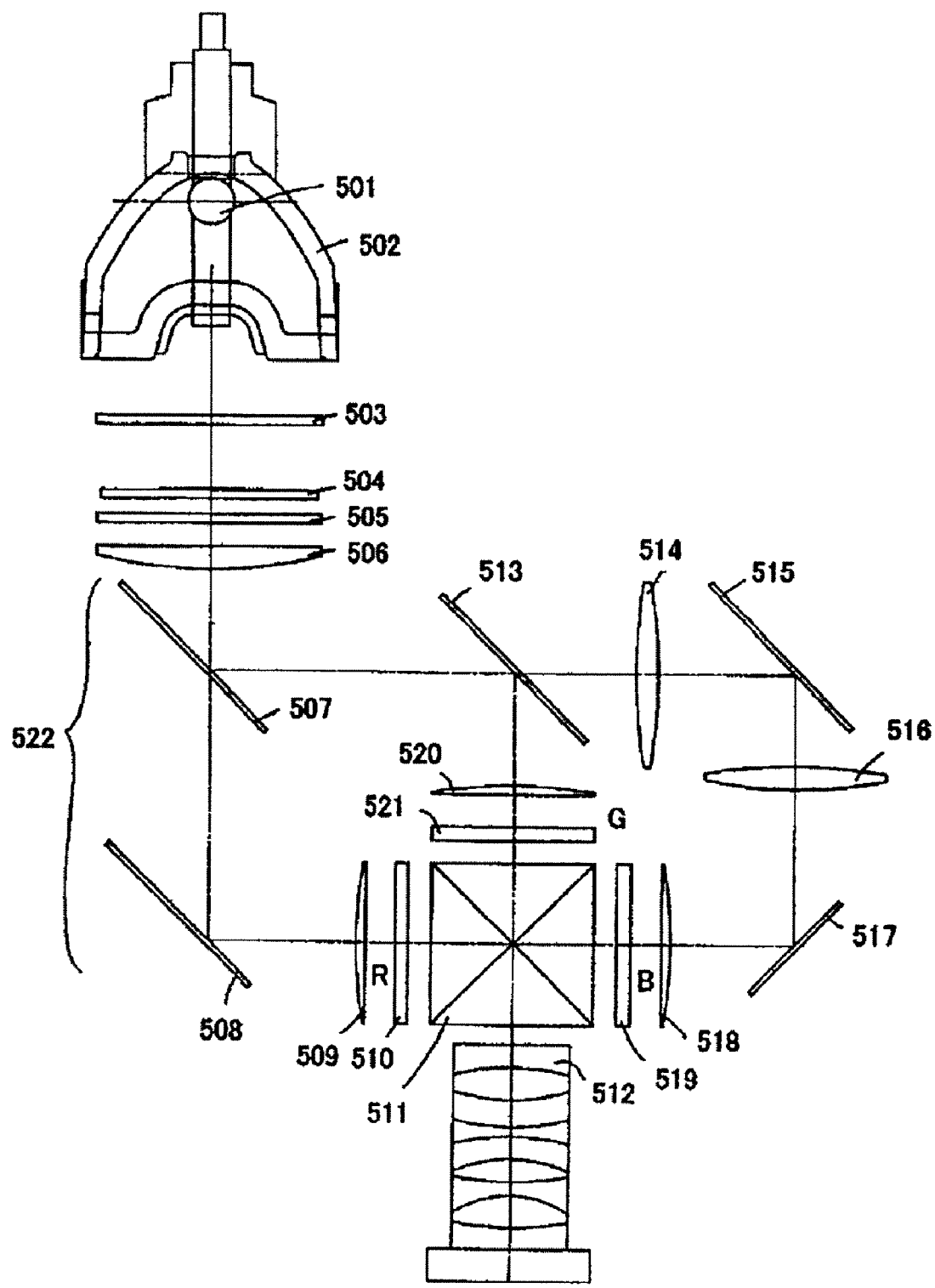
FIG. 14 shows the structures of a projection display optical system and a liquid crystal projector including the projection display optical system, which are Embodiment 5 of the present invention.

FIG. 14 shows the structure of a projection display optical system in which a wavelength-selective polarization conversion element which is Embodiment 5 of the present invention is used as well as the structure of a liquid crystal projector including the projection display optical system.

A luminous flux emitted from a white light source 501 is converted into a collimated luminous flux by a parabolic reflector 502 and emerges therefrom. The collimated luminous flux is divided into a plurality of luminous fluxes by a first fly-eye lens 503, and the respective divided luminous fluxes are converged. The respective divided luminous fluxes are converged at positions close to a second fly-eye lens 504 and a wavelength-selective polarization conversion element 505 and then form images (secondary image s) of the light source.

Each of the fly-eye lenses 503 and 504 is formed of a plurality of lens cells arranged two-dimensionally. Each of the lens cells has a rectangular lens shape similar to a liquid crystal panel which is a surface to be illuminated, later described.

The luminous flux emerging from the second fly-eye lens 504 and entering the wavelength-selective polarization conversion element 505 is non-polarized light containing S-polarized light which is linearly polarized light with a first polarization direction and P-polarized light which is linearly polarized light with a second polarization direction.

The wavelength-selective polarization conversion element 505 converts light in the R and B bands of the divided luminous fluxes emerging from the second fly-eye lens 504 into S-polarized light. The R and B bands are first and third wavelength regions. It also converts light in the G band, which is a second wavelength region, into P-polarized light.

The S-polarized light components in the R and B bands and the P-polarized light component in the G band emerge from the wavelength-selective polarization conversion element 505 and are converged by a condenser lens 506. Further, the divided luminous fluxes gathered by the condenser lens 506 overlap with each other to illuminate transmissive liquid crystal panels 510, 521 and 519 for the R, G and B bands (hereinafter referred to as R, G and B liquid crystal panels) through a color separation/combination optical system 522.

The color separation/combination optical system 522 includes a first dichroic mirror 507 which transmits the light in the R band and reflects the light in the B and G bands. The polarized light in the R band transmitted through the first dichroic mirror 507 is reflected by a reflecting mirror 508, passes through a field lens 509 and enters the R liquid crystal panel 510. The traveling direction of the light (image light) modulated by the R liquid crystal panel 510 is changed by 90 degrees by a dichroic prism 511, and the light is projected onto a screen, not shown, by a projection lens 512.

On the other hand, of the polarized light in the B and G bands reflected by the dichroic mirror 507, the polarized light in the G band is reflected by a second dichroic mirror 513, and the polarized light in the B band is transmitted therethrough. The polarized light in the G band reflected by the second dichroic mirror 513 is then transmitted through a field lens 520 and enters the G liquid crystal panel 521. The light modulated by the G liquid crystal panel 521 is transmitted through the dichroic prism 511 and then projected onto the screen by the projection lens 512.

The light in the B band transmitted through the second dichroic mirror 513 enters the B liquid crystal panel 519 after passing through relay lenses 514, 516, reflection by reflecting mirrors 515, 517 and passing through a field lens 518. The traveling direction of the light (image light) modulated by the B liquid crystal panel 519 is changed by 90 degrees by the dichroic prism 511, and the light is projected onto the screen by the projection lens 512. In this manner, the projected image of full color (RGB) is displayed on the screen.

Next, the structure and the optical effects of the abovementioned wavelength-selective polarization conversion element 505 will be described in detail with reference to FIG. 15. The wavelength-selective polarization conversion element 505 is formed of a plurality of polarization conversion cells C having the same structure and provided for the plurality of lens cells forming each of the fly-eye lenses 503 and 504. In the entrance surface for light of each of the polarization conversion cells C, a light-shield plate 54 is provided for blocking entrance of light in the area from the position of a wavelength-selective polarization beam splitting film 52, later described, to the position of a reflecting film 51 below that film 52. This causes light to enter the wavelength-selective polarization conversion element 505 only through the area between the wavelength-selective polarization beam splitting film 52 and the reflecting film 51 placed above that film 52 in the entrance surface of each polarization conversion cell C. Reference numeral 56 shows a phase plate. The wavelength-selective polarization beam splitting film 52 will hereinafter be referred to simply as the polarization beam splitting film.

Figure 15:
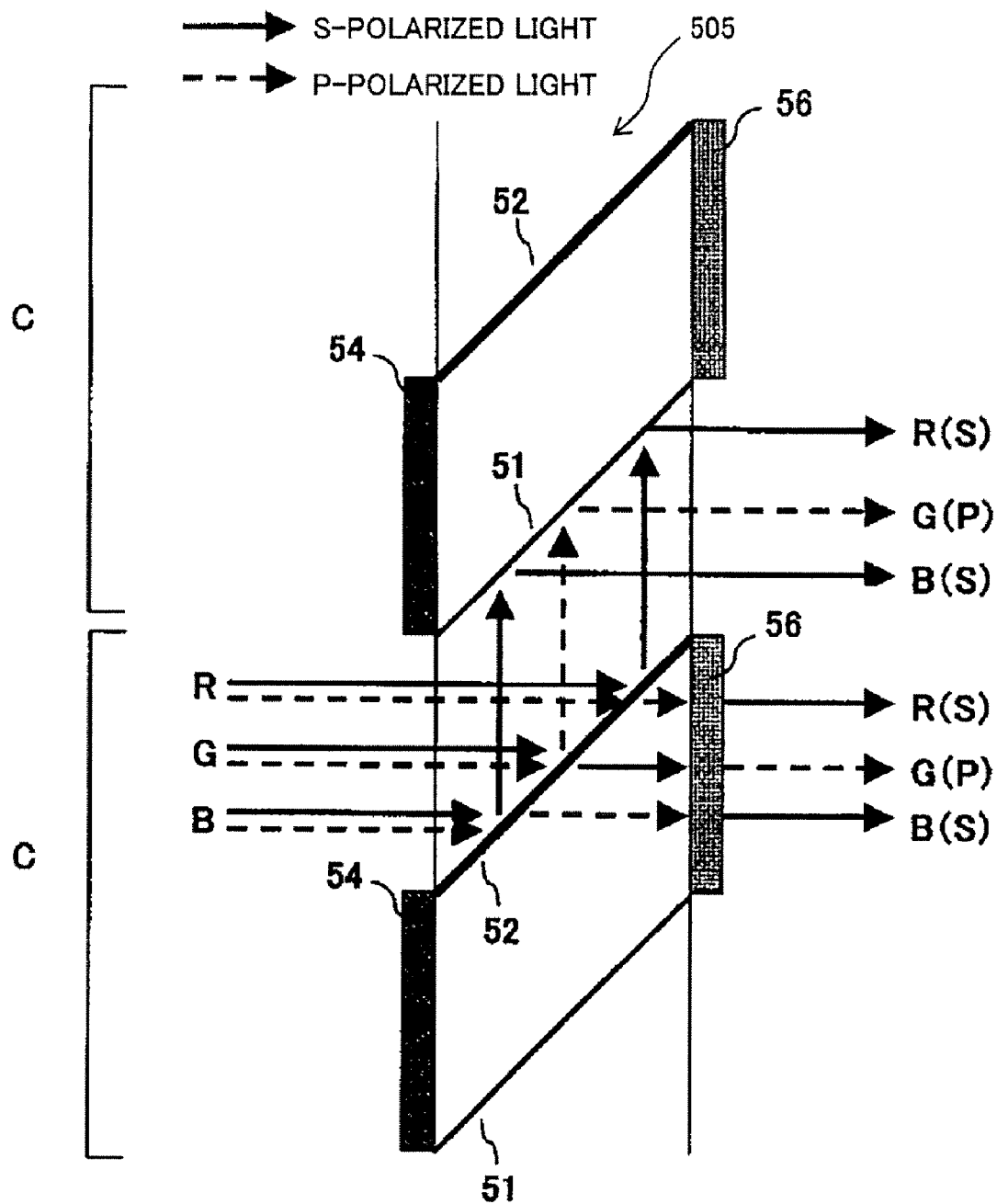
FIG. 15 is a schematic diagram showing the structure of a wavelength-selective polarization conversion element used in Embodiment 5.

The polarization beam splitting film 52 is placed at an inclination of 45 degrees with respect to the direction of entrance of light (from left to right in FIG. 15). The reflecting film 51 is disposed in parallel with the polarization beam splitting film 52. The polarization beam splitting film 52 is actually formed as a multilayer film provided on a surface of a substrate made of glass or acrylic which is a parallel plate.

The phase plate 56 is formed as a film an provided in the area from the position of the polarization beam splitting film 52 to the position of the reflecting film 51 below that film 52 in the emergence surface of the wavelength-selective polarization conversion element 505.

As shown in FIG. 3, the phase plate 56 may be formed on the emergence side of a substrate having the polarization beam splitting film 52 formed on the entrance side.

The same polarization beam splitting film 52 as that in Embodiment 4 is used in Embodiment 5. The phase plate 56 is a half-wave plate and has a function of rotating the polarization direction of entering linearly polarized light by 90 degrees, which is similar to the phase plate 53 in Embodiment 4.

In this manner, white-color non-polarized light enters the wavelength-selective polarization conversion element 505 formed as the single element and is converted into the S-polarized light in the R and B bands and the P-polarized light in the G band, and they emerge from the element 505.

As described in Embodiment 2, the incident angle on the polarization beam splitting film 52 is not limited to 45 degrees. The material of the glass substrate, the materials of the thin films, the order, the number and the thicknesses of the thin films shown in Table 1 are not limited to those shown in Table 1.

In a conventional structure in which a polarization conversion element and a transmissive liquid crystal panel are used, a phase plate for rotating the polarization direction of entering linearly polarized light by 90 degrees is placed between the field lens 520 and the G liquid crystal panel 521 shown in FIG. 14. This is provided for reducing loss of light in the dichroic prism by using P-polarized light in the G band and S-polarized light in the R and B bands.

In contrast, the wavelength-selective polarization conversion element 505 according to Embodiment 5 can be used to realize the similar effects without placing the phase plate between the field lens 520 and the G liquid crystal panel 521.

While Embodiment 5 has been described in conjunction with the liquid crystal panels 510, 519 and 521 for the R, B and G bands, respectively, any combination of the placement of the liquid crystal panels and the bands can be used.

As described above, according to Embodiments 1 to 5, the combined effects of the polarization beam splitting film and the phase plate having the characteristics as described above allow the emerging light in two of the first to third wavelength regions to have the polarization direction different from that of the emerging light in the other wavelength region. This can realize the polarization conversion element as the single element having the wavelength-selective polarization conversion function.

As a result, the light in one of the two wavelength regions and the light in the other of the two wavelength regions can be directed from the polarization conversion element to the polarization beam splitter through the same optical path without passing through the conventional wavelength-selective phase plate. This means that the polarization beam splitter can separate the light in the two wavelength regions into light in one wavelength region and light in the other wavelength region based on the polarization directions without the conventional phase plate. Therefore, it is possible to reduce the number of optical components of the projection display optical system or the image projection apparatus for performing color separation with the polarization beam splitter and directing the light in the first wavelength region, the light in the second wavelength region and the light in the third wavelength region to the associated image-forming elements, as compared with the conventional ones.

Since the wavelength-selective phase plate is eliminated, a member for supporting or cooling it is not required, thereby simplifying the structure of the image projection apparatus.

A structure different from those in Embodiments 1 to 5 can be used for the wavelength-selective polarization conversion element. It is possible to convert one of the light in the R band, the light in the G band and the light in the B bands into P-polarized light and the others thereof into S-polarized light, or to convert the one into S-polarized light and the others into P-polarized light. Such a wavelength-selective polarization conversion element can provide a structure of an image projection apparatus different from those in Embodiment 1 to 5.

Embodiments 1 to 5 have been described in conjunction with the use of the reflective liquid crystal panel or the transmissive liquid crystal panel as the image-forming element. Another image-forming element, for example a DMD (Digital Micromirror Device) may be used in the present invention.

TABLE 1

| | EMBODIMENT 1 | EMBODIMENT 2 | EMBODIMENT 4 |
|---|---|---|---|
| FILM STRUCTURE | 32 | 42 | 52 |
| GLASS SUBSTRATE | PBH56 | LAL14 | PBH56 |
| H LAYER | TiO$_2$ | TiO$_2$ | TiO$_2$ |
| M LAYER | Al$_2$O$_3$ | Al$_2$O$_3$ | Al$_2$O$_3$ |
| L LAYER | MgF$_2$ | MgF$_2$ | MgF$_2$ |
| INCIDENT ANGLE | 45° | 50° | 45° |

| NUMBER OF LAYERS | MATERIAL | FILM THICKNESS | MATERIAL | FILM THICKNESS | MATERIAL | FILM THICKNESS |
|---|---|---|---|---|---|---|
| 1 | M | 339.13 | M | 95 | M | 324.49 |
| 2 | L | 99.86 | L | 73.92 | L | 108.9 |
| 3 | M | 161.77 | M | 179.3 | M | 181.68 |
| 4 | H | 38.96 | H | 33.44 | H | 64.35 |
| 5 | M | 153 | M | 158.08 | M | 173.73 |
| 6 | L | 148.05 | L | 140.25 | L | 143.91 |

TABLE 1-continued

| | | | | | | |
|---|---|---|---|---|---|---|
| 7 | M | 119.25 | M | 118.92 | M | 140.09 |
| 8 | H | 59.33 | H | 59.16 | H | 74.7 |
| 9 | M | 136.21 | M | 134.52 | M | 168.69 |
| 10 | L | 156.14 | L | 181.79 | L | 166.85 |
| 11 | M | 141.85 | M | 130.64 | M | 154.32 |
| 12 | H | 56.56 | H | 57.98 | H | 75.4 |
| 13 | M | 147.03 | M | 134.69 | M | 151.5 |
| 14 | L | 122.17 | L | 126.98 | L | 152.25 |
| 15 | M | 147.19 | M | 153.12 | M | 168.37 |
| 16 | H | 57.05 | H | 54.84 | H | 74.27 |
| 17 | M | 132.48 | M | 140.13 | M | 141.1 |
| 18 | L | 158.35 | L | 170.77 | L | 181.01 |
| 19 | M | 145.32 | M | 134.18 | M | 185.61 |
| 20 | H | 52.45 | H | 53.33 | H | 61.19 |
| 21 | M | 135.41 | M | 118.98 | M | 158.16 |
| 22 | L | 163 | L | 219.45 | L | 135.48 |
| 23 | M | 158.75 | M | 139.16 | M | 142.26 |
| 24 | H | 35.1 | H | 46.7 | H | 48.33 |
| 25 | M | 145.63 | M | 132.7 | M | 230.33 |
| 26 | L | 186.09 | L | 172.5 | L | 140.07 |
| 27 | M | 139.81 | M | 139.29 | M | 188.83 |
| 28 | H | 33.39 | H | 41.38 | H | 325.03 |
| 29 | M | 158.11 | M | 165.27 | M | 158.34 |
| 30 | L | 121.2 | L | 141.27 | H | 268.72 |
| 31 | M | 153.8 | M | 131.88 | M | 159.29 |
| 32 | H | 39.28 | H | 41.97 | H | 176.72 |
| 33 | M | 80.79 | M | 165.41 | M | 273.14 |
| 34 | H | 124.47 | H | 89 | H | 218.07 |
| 35 | M | 53.47 | M | 187.37 | M | 198.13 |
| 36 | H | 103.01 | H | 48.71 | H | 261.79 |
| 37 | M | 70.64 | M | 63.9 | M | 217.12 |
| 38 | H | 114.52 | H | 125.27 | H | 169.83 |
| 39 | M | 80.86 | M | 106.15 | M | 76.51 |
| 40 | H | 106.17 | H | 72.06 | H | 44.79 |
| 41 | M | 59.78 | M | 185.26 | M | 105.66 |
| 42 | H | 113.89 | H | 76.48 | H | 47.85 |
| 43 | ADHESIVE | | M | 120.14 | M | 98.02 |
| 44 | — | — | H | 104.48 | H | 41.31 |
| 45 | — | — | ADHESIVE | | M | 93.17 |
| 46 | — | — | — | — | H | 52.74 |
| 47 | — | — | — | — | M | 108.15 |
| 48 | — | — | — | — | H | 43.83 |
| 49 | — | — | — | — | M | 61.63 |
| 50 | — | — | — | — | H | 35.59 |
| 51 | — | — | — | — | M | 102.16 |
| 52 | — | — | — | — | H | 137.92 |
| | — | — | — | — | ADHESIVE | |

While the preferred embodiments of the present invention have been described, the present invention is not limited to the abovementioned embodiments and various modifications and variations may be made without departing from the spirit or scope of the present invention.

This application claims foreign priority benefits based on Japanese Patent Application No. 2005-356595, filed on Dec. 9, 2005, which is hereby incorporated by reference herein in its entirety as if fully set forth herein.

What is claimed is:

1. A wavelength-selective polarization conversion element which converts non-polarized light containing light in a first wavelength region, light in a second wavelength region, and light in a third wavelength region into polarized light, comprising:
   a polarization beam splitting film which has a function of splitting light through transmission and reflection and has a characteristic in which each of the transmittance for light with a first polarization direction and the transmittance for light with a second polarization direction orthogonal to the first polarization direction is changed between a value higher than 50% and a value lower than 50% depending on the wavelength region; and
   a phase plate which changes the polarization direction of light transmitted or reflected by the polarization beam splitting film between the first polarization direction and the second polarization direction,
   wherein the polarization conversion element causes light in two of the first, second and third wavelength regions to emerge as polarized light with one of the first and second polarization directions and causes light component in the other one of the first, second and third wavelength regions to emerge as polarized light with the other of the first and second polarization directions.

2. The polarization conversion element according to claim 1, wherein the polarization beam splitting film has an optical characteristic in which the transmittance for light with the first polarization direction in the two wavelength regions is higher than 50%, the transmittance for light with the first polarization direction in the other wavelength region is lower than 50%, the transmittance for light with the second polarization direction in the two wavelength regions is lower than 50%, and the transmittance for light with the second polarization direction in the other wavelength region is higher than 50%.

3. The polarization conversion element according to claim 1, wherein light with the first polarization direction in the two wavelength regions is transmitted through the polarization beam splitting film and converted into light with the second polarization direction by the phase plate, and the resulting light with the second polarization direction emerges from the polarization conversion element, light with the second polarization direction in the two wavelength regions is reflected by the polarization beam splitting film and emerges from the polarization conversion element, light with the first polarization direction in the other wavelength region is reflected by the polarization beam splitting film and emerges from the polarization conversion element, and light with the second polarization direction in the other wavelength region is transmitted through the polarization beam splitting film and converted into light in the first polarization direction by the phase plate, and the resulting light with the first polarization direction emerges from the polarization conversion element.

4. The polarization conversion element according to claim 1, wherein light with the first polarization direction in the two wavelength regions is transmitted through the polarization beam splitting film and emerges from the polarization conversion element, light with the second polarization direction in the two wavelength regions is reflected by the polarization beam splitting film and converted into light in the first polarization direction by the phase plate, and the resulting light with the first polarization direction emerges from the polarization conversion element, and light with the first polarization direction in the other wavelength region is reflected by the polarization beam splitting film and converted into light with the second polarization direction by the phase plate, and the resulting light with the second polarization direction emerges from the polarization conversion element, and light with the second polarization direction in the other wavelength region is transmitted through the polarization beam splitting film and emerges from the polarization conversion element.

5. The polarization conversion element according to claim 1, further comprising a reflecting surface which reflects light reflected by the polarization beam splitting film and directs the reflected light toward a direction of emergence from the polarization conversion element.

6. An illumination optical system comprising:
the polarization conversion element according to claim 1, the element converting non-polarized light containing light in a first wavelength region, light in a second wavelength region, and light in a third wavelength region emerging from a light source into polarized light.

7. A projection display optical system comprising:
an illumination optical system including the polarization conversion element according to claim 1, the element converting non-polarized light containing light in a first wavelength region, light in a second wavelength region and light in a third wavelength region emerging from a light source into polarized light;

a color separation/combination optical system which directs the light in the first wavelength region, the light in the second wavelength region and the light in the third wavelength region from the illumination optical system to a first image-forming element, a second image-forming element and a third image-forming element, respectively, and combines light from the first image-forming element, light from the second image-forming element and light from the third image-forming element; and a projection lens which projects the combined light.

8. The projection display optical system according to claim 7, wherein the illumination optical system includes a lens array which divides the non-polarized light into a plurality of luminous fluxes, the wavelength-selective polarization conversion element, and a condenser lens which converges the luminous fluxes from the wavelength-selective polarization conversion element.

9. An image projection apparatus comprising:
the projection display optical system according to claim 7; and a drive circuit which drives the first, second and third image-forming elements based on an image signal input thereto.

10. An image display system comprising:
the image projection apparatus according to claim 9; and
an image supply apparatus which supplies an image signal to the image projection apparatus.

* * * * *